United States Patent
Yoshihiro et al.

(10) Patent No.: US 9,931,552 B2
(45) Date of Patent: Apr. 3, 2018

(54) TUBULAR CARBON FIBER REINFORCED COMPOSITE MATERIAL AND GOLF CLUB SHAFT

(71) Applicant: TORAY INDUSTRIES, INC., Tokyo (JP)

(72) Inventors: Kazuki Yoshihiro, Iyo-gun (JP); Mami Sakaguchi, Iyo-gun (JP); Takayuki Fujiwara, Iyo-gun (JP); Tomoko Ichikawa, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/528,719

(22) PCT Filed: Jan. 13, 2016

(86) PCT No.: PCT/JP2016/050779
§ 371 (c)(1),
(2) Date: May 22, 2017

(87) PCT Pub. No.: WO2016/157933
PCT Pub. Date: Oct. 6, 2016

(65) Prior Publication Data
US 2018/0001165 A1 Jan. 4, 2018

(30) Foreign Application Priority Data

Mar. 27, 2015 (JP) .................................. 2015-066014

(51) Int. Cl.
*A63B 53/10* (2015.01)
*A63B 60/08* (2015.01)
*C08L 63/00* (2006.01)

(52) U.S. Cl.
CPC .............. *A63B 53/10* (2013.01); *A63B 60/08* (2015.10); *C08L 63/00* (2013.01); *A63B 2209/02* (2013.01)

(58) Field of Classification Search
CPC ..... A63B 53/10; A63B 60/08; A63B 2209/02; C08L 63/00
See application file for complete search history.

(56) References Cited

FOREIGN PATENT DOCUMENTS

| JP | 8-308969 A | 11/1996 |
|---|---|---|
| JP | 2001-54602 A | 2/2001 |
| JP | 2003-103519 A | 4/2003 |
| JP | 2009-74009 A | 4/2009 |
| JP | 2010-57462 A | 3/2010 |

OTHER PUBLICATIONS

International Search Report, issued in PCT/JP2016/050779, PCT/ISA/210, dated Mar. 1, 2016.
Written Opinion of the International Searching Authority, issued in PCT/JP2016/050779, PCT/ISA/237, dated Mar. 1, 2016.

*Primary Examiner* — Michael C Miggins
(74) *Attorney, Agent, or Firm* — Birch, Stewart, Kolasch & Birch, LLP

(57) ABSTRACT

Provided are tubular carbon fiber reinforced composite material and having excellent cylindrical bending strength and a golf club shaft using the same. This tubular carbon fiber reinforced composite material is formed by laminating and curing a straight layer and a bias layer. The straight layer comprises carbon fibers S coated with a sizing agent S and arranged in parallel in a direction of −20° to +20° with respect to the axis of the tubular body, and contains a thermosetting resin S. The bias layer comprises carbon fibers B coated with a sizing agent B and arranged in parallel in a direction of +25° to +65° with respect to the axis of the tubular body, and contains a thermosetting resin B. The carbon fiber reinforced composite material constituting the bias layer has an interlaminar shear strength of not less than 110 MPa. A cured product of the thermosetting resin S has an elastic modulus of not less than 4.0 GPa.

11 Claims, No Drawings

TUBULAR CARBON FIBER REINFORCED COMPOSITE MATERIAL AND GOLF CLUB SHAFT

TECHNICAL FIELD

The present invention relates to a tubular carbon fiber reinforced composite material composed of a carbon fiber reinforced composite material. More specifically, the present invention relates to tubular carbon fiber reinforced composite material that is light and has excellent torsional strength, and is suitably used for sporting goods such as a golf club shaft, tennis and badminton racket, aerospace structures, truss, mast, ships, and propeller shafts of automobiles, and a golf club shaft using the same.

BACKGROUND ART

A carbon fiber reinforced composite material comprising a carbon fiber and a matrix resin has excellent lightweight performance and dynamic characteristics, thus is widely used in aerospace applications, general industrial applications, including sports uses.

In sports uses, a carbon fiber reinforced composite material is often formed into a tubular carbon fiber reinforced composite material, and is used for a golf club shaft, a fishing rod, rackets of tennis and badminton, and the like. These applications are fields in which weight reduction is particularly required, and a method for increasing material strength is adopted as an example of weight reducing method.

In a carbon fiber reinforced composite material, a tubular carbon fiber reinforced composite material strength is increased by properly applying a carbon fiber having high strength or high elastic modulus. Patent Document 1 suggests tubular carbon fiber reinforced composite material having high torsional strength, by using a carbon fiber showing high strand tensile elastic modulus. However, in recent years, as the level of required characteristics to a carbon fiber reinforced composite material is increased, the material strength achievable only by improving performance of carbon fiber is being insufficient.

An epoxy resin is suitably used as a matrix resin of a carbon fiber reinforced composite material, in aspects of its excellent mechanical characteristics, good adhesion to a carbon fiber, and the like. Patent Document 2 suggests a tubular carbon fiber reinforced composite material having excellent cylinder bending strength and impact resistance, using a bisphenol F epoxy resin and an amine epoxy resin. Also, Patent Document 3 suggests a method for increasing a three-point bending strength of tubular carbon fiber reinforced composite material, by using an epoxy resin cured product cured at a specific degree of crosslinking.

A technology for increasing shear strength between a carbon fiber and a matrix resin is also disclosed. Patent Document 4 discloses a method for increasing crushing strength and impact resistance of tubular carbon fiber reinforced composite material, by increasing in-plane shear strength.

PRIOR ART DOCUMENTS

Patent Documents

Patent Document 1: Japanese Patent Laid-open Publication No. 2005-290627

Patent Document 2: Japanese Patent Laid-open Publication No. 2012-197414

Patent Document 3: Japanese Patent Laid-open Publication No. 2014-111727

Patent Document 4: Japanese Patent Laid-open Publication No. 2000-254917

SUMMARY OF THE INVENTION

Problems to be Solved by the Invention

In the above documents, studies focusing on shear strength of a carbon fiber reinforced composite material, the kind of the epoxy resin that is a matrix resin, and improvement in the resin elastic modulus and the like have been conducted, and further improvement in the strength of tubular carbon fiber reinforced composite material is required. In addition, a technical idea in which fracture mode is highly controlled, focusing on both the interlaminar shear strength of the carbon fiber reinforced composite material and the resin elastic modulus of the matrix resin, to improve dynamic characteristics of the tubular carbon fiber reinforced composite material has not been disclosed.

Thus, in view of the above-described problem of the related art, it is an object of the present invention to provide a tubular carbon fiber reinforced composite material having excellent cylinder bending strength, and a golf club shaft using the same.

Solutions to the Problems

The present invention has the following constitution for achieving the object described above. More specifically, the tubular carbon fiber reinforced composite material of the present invention is obtained by laminating a straight layer comprises a thermosetting resin S, in which a carbon fiber S coated with a sizing agent S is arranged in a sheet form with a direction of −20° to +20° with respect to the tube axis of a tubular body, and a bias layer comprising a thermosetting resin B, in which a carbon fiber B coated with a sizing agent B is arranged in a sheet form with a direction of +25° to +65° with respect to the tube axis of a tubular body, and the interlaminar shear strength of the carbon fiber reinforced composite material constituting the bias layer is 110 MPa or more, and the elastic modulus of a cured product of the thermosetting resin S is 4.0 GPa or more.

Here, the "sizing agent S", "carbon fiber S", and "thermosetting resin S" represent a sizing agent, a carbon fiber, and a thermosetting resin used in the straight layer, respectively, and the "sizing agent B", "carbon fiber B", and "thermosetting resin B" represent a sizing agent, a carbon fiber, and a thermosetting resin used in the bias layer, respectively.

Also, the golf club shaft of the present invention comprises using the tubular carbon fiber reinforced composite material.

Effects of the Invention

According to the present invention, tubular carbon fiber reinforced composite material having high cylinder bending strength.

EMBODIMENTS OF THE INVENTION

Hereinbelow, the tubular carbon fiber reinforced composite material of the present invention will be described (hereinafter, tubular body), in further detail.

The tubular carbon fiber reinforced composite material of the present invention is obtained by laminating a straight layer comprises a thermosetting resin S, in which a carbon fiber S coated with a sizing agent S is arranged in parallel with a direction of −20° to +20° with respect to the tube axis of a tubular body, and a bias layer comprising a thermosetting resin B, in which a carbon fiber B coated with a sizing agent B is arranged in parallel with a direction of +25° to +65° with respect to the tube axis of a tubular body, and the interlaminar shear strength of the carbon fiber reinforced composite material constituting the bias layer is 110 MPa or more, and the elastic modulus of a cured product of the thermosetting resin S is 4.0 GPa or more.

The present inventors have found that, when the elastic modulus of a cured product of the thermosetting resin S is 4.0 GPa or more, the starting point of fracture transits from a cured product in the straight layer to a cured product in the bias layer in a cylinder bending test. Furthermore, the present inventors have found that the cylinder bending strength of a tubular carbon fiber reinforced composite material is increased when the interlaminar shear strength of the carbon fiber reinforced composite material constituting the bias layer is 110 MPa or more in the above conditions, thereby arriving at the present invention. That is, the present inventors have found that a straight layer using a thermosetting resin in which a cured product has specific elastic modulus, and a bias layer providing a carbon fiber reinforced composite material having specific interlaminar shear strength are combined, thereby obtaining high cylinder bending strength.

It has been confirmed that, even when the interlaminar shear strength of the carbon fiber reinforced composite material constituting the bias layer is 110 MPa or more, in a case where the elastic modulus of a cured product of the thermosetting resin S is less than 4.0 GPa, the carbon fiber reinforced composite material fractures in the cured product in the straight layer, and cylinder bending strength is not sufficient.

It has been confirmed that, even when the elastic modulus of a cured product of the thermosetting resin S is 4.0 GPa or more, in a case where the interlaminar shear strength of the carbon fiber reinforced composite material constituting the bias layer is less than 110 MPa, improvement in cylinder bending strength is not sufficient.

In the straight layer of the present invention, the arrangement direction of the carbon fiber S with respect to the tube axis direction of a tubular body is −20° to +20°. In the above range, a bending stress that can be supported by a cured product in the straight layer is high, thus a bending strength as a tubular carbon fiber reinforced composite material is increased. Also, a more preferred range of the carbon fiber S is −10° to +10°.

In the bias layer of the present invention, the arrangement direction of a carbon fiber B with respect to the tube axis direction of a tubular body is +25° to +65°. In the above range, a shear stress that can be supported by a cured product in the bias layer is high, thus the bending strength of a tubular carbon fiber reinforced composite material is increased. Also, it is preferred that a more preferred range of the carbon fiber B is preferably +35° to +55°.

The tubular carbon fiber reinforced composite material may comprise a bias layer of a double-layer structure in which carbon fibers are oriented in axial symmetry each other with respect to the tube axis direction.

The fiber basis weight of the straight layer and/or the bias layer is preferably 50 to 200 g/m², and the fiber content is preferably 65 to 87 mass %. The ranges of a fiber basis weight of 50 to 200 g/m² and a fiber content of 65 to 87 mass % are preferable since the weight reducing effect and moldability of a tubular carbon fiber reinforced composite material are improved. The fiber basis weight is more preferably 70 to 150 g/m². The fiber content is more preferably 70 to 85 mass %.

In the state before curing the tubular carbon fiber reinforced composite material of the present invention, at least one layer of the straight layer is preferably arranged on the outer peripheral side of the bias layer. When the straight layer is arranged on the outer peripheral side of the bias layer, it is preferable since the cylinder bending strength of a tubular carbon fiber reinforced composite material is increased.

In the state before curing the tubular carbon fiber reinforced composite material of the present invention, other than the bias layer and straight layer described above, a layer containing carbon fibers arranged in various directions can be arranged, thus various performance can be provided to the tubular carbon fiber reinforced composite material. For example, in order to provide with crushing force resistance to resist crushing force from sides, a hoop layer in which the carbon fiber direction with respect to the tube axis of a tubular body is +75° to +90° can be arranged between an innermost layer, the bias layer and the straight layer, or on an outermost layer.

The elastic modulus of a cured product of the thermosetting resin S according to the tubular carbon fiber reinforced composite material of the present invention is 4.0 GPa or more. When the elastic modulus of a cured product of the thermosetting resin S is 4.0 GPa or more, fracture in the cured product in the straight layer is suppressed, and the cylinder bending strength of a tubular carbon fiber reinforced composite material is increased. The elastic modulus is preferably 4.2 GPa or more, and further preferably 4.4 GPa or more.

The elastic modulus of a cured product of the thermosetting resin B according to the tubular carbon fiber reinforced composite material of the present invention is preferably 4.0 GPa or more. When the elastic modulus of a cured product of the thermosetting resin B is 4.0 GPa or more, the interlaminar shear strength is improved, thus the cylinder bending strength of a tubular carbon fiber reinforced composite material is improved. The elastic modulus is more preferably 4.2 GPa or more, and further preferably 4.4 GPa or more.

The elastic modulus of a cured product of the thermosetting resin can be obtained by three-point bending according to JIS K7171 (1994). The curing conditions are 130° C., 2 hours.

The interlaminar shear strength of the carbon fiber reinforced composite material used in the bias layer of the present invention is 110 MPa or more. When the interlaminar shear strength of the carbon fiber reinforced composite material constituting the bias layer is 110 MPa or more, the shear stress that can be supported by a cured product in the bias layer is increased. When the interlaminar shear strength is less than 110 MPa, the cylinder bending strength becomes the same level or less as a maximum value in a case where the cured product in the straight layer fractures. The interlaminar shear strength is preferably 120 MPa or more, and more preferably 130 MPa or more.

The interlaminar shear strength of the carbon fiber reinforced composite material used in the straight layer of the present invention is preferably 110 MPa or more. The tubular carbon fiber reinforced composite material has an exchange action of stresses between the cured product in the straight layer and the cured product in the bias layer, thus a material having high interlaminar shear strength is used in the straight layer, thereby increasing the cylinder bending strength of a tubular carbon fiber reinforced composite material, thus it is preferred. The interlaminar shear strength is more preferably 120 MPa or more, and further preferably 130 MPa or more.

Twelve layers of prepregs constituting the carbon fiber reinforced composite material used in the straight layer or the bias layer were laminated in 0° direction, and heated and cured in an autoclave at a temperature of 130° C., a pressure of 0.6 MPa for 2 hours, and then the interlaminar shear strength was determined, according to ASTM D2344.

The interlaminar shear strength of the carbon fiber reinforced composite material can be controlled by physical properties of the carbon fiber coated with the sizing agent, adhesion between the carbon fiber and the cured product of a thermosetting resin (hereinafter, simply referred to as adhesion), and physical properties of the cured product of a thermosetting resin.

Next, components constituting the tubular carbon fiber reinforced composite material will be described.

Examples of the carbon fiber S and/or carbon fiber B of the present invention include polyacrylonitrile (PAN)-based, rayon-based, and pitch-based carbon fibers. Among them, it is preferable to use PAN-based carbon fibers, which have an excellent balance of strength and elastic modulus. The strand tensile strength is preferably 3.5 GPa or more. A strand tensile strength of 3.5 GPa or more is preferable since the interlaminar shear strength of the carbon fiber reinforced composite material is improved. The strand tensile strength is more preferably 4.0 GPa or more, and further preferably 5.0 GPa or more. Also, the strand elastic modulus of the carbon fiber is preferably 220 GPa or more. A strand elastic modulus of 220 GPa or more is preferable since the interlaminar shear strength of the carbon fiber reinforced composite material is improved. The strand elastic modulus is more preferably 240 GPa or more.

In the present invention, the strand elastic modulus and strand tensile strength can be determined in accordance with JIS-R-7608 (2004), Resin-Impregnated Strand Test Method. The resin formulation is as follows: "Celloxide®" 2021P (manufactured by Daicel Chemical Industries, Ltd.)/boron trifluoride monoethylamine (manufactured by Tokyo Chemical Industry Co., Ltd.)/acetone=100/3/4 (part by mass). The curing conditions are 130° C., 30 minutes.

In the carbon fiber B of the present invention, it is preferred that the surface oxygen concentration (O/C) determined by X-ray photoelectron spectroscopy is 0.25 or less, the surface hydroxyl group concentration (COH/C) determined by chemical modification X-ray photoelectron spectroscopy is 0.005 or more, and the surface carboxyl group concentration (COOH/C) determined by chemical modification X-ray photoelectron spectroscopy is 0.01 or less.

In the carbon fiber B of the present invention, it is preferred that the surface oxygen concentration (O/C) that is the ratio of the number of atoms of oxygen (O) to that of carbon (C) on a carbon fiber surface, determined by X-ray photoelectron spectroscopy is 0.25 or less. When the surface oxygen concentration (O/C) is 0.25 or less, it is preferred since a fragile layer is unlikely to be formed on the carbon fiber surface, and adhesion between the carbon fiber and the cured product resin of a thermosetting resin is increased. The surface oxygen concentration (O/C) is preferably 0.10 or more, and more preferably 0.14 or more. When the surface oxygen concentration (O/C) is 0.10 or more, it is preferred since an interaction between the carbon fiber and the sizing agent is increased, thus adhesion between the carbon fiber and the cured product resin of a thermosetting resin is improved, and the interlaminar shear strength is improved.

In the carbon fiber B of the present invention, it is preferred that the surface hydroxyl group concentration (COH/C) that is the ratio of the number of atoms of hydroxyl group (OH) to that of carbon (C) on a carbon fiber surface determined by chemical modification X-ray photoelectron spectroscopy is 0.005 or more. When the surface hydroxyl group concentration (COH/C) is 0.005 or more, an interaction between the carbon fiber and the sizing agent is increased, adhesion between the carbon fiber and the cured product of a thermosetting resin is improved, and the interlaminar shear strength is improved. The surface hydroxyl group concentration (COH/C) is more preferably 0.016 or more. As the upper limit of the surface hydroxyl group concentration (COH/C), 0.03 is sufficient in terms of adhesion.

In the carbon fiber B of the present invention, it is preferred that the carboxyl group concentration (COOH/C) that is the ratio of the number of atoms of carboxyl group (COOH) to that of carbon (C) on a carbon fiber surface, determined by chemical modification X-ray photoelectron spectroscopy is preferably 0.01 or less, and more preferably 0.005 or less. When the surface carboxyl group concentration (COOH/C) is 0.01 or less, it is preferred since a fragile layer is not generated, adhesion to the cured product of a thermosetting resin due to an oxide layer is improved, and the interlaminar shear strength is increased.

The surface oxygen concentration (O/C), surface hydroxyl group concentration (COH/C) and surface carboxyl group concentration (COOH/C) of the carbon fiber S of the present invention are not limited, but a carbon fiber in the above ranges is preferably used. A material having high interlaminar shear strength is used in the straight layer, thereby increasing the cylinder bending strength of a tubular carbon fiber reinforced composite material, thus it is preferred.

The surface oxygen concentration (O/C) of the carbon fiber S and/or carbon fiber B is determined by X-ray photoelectron spectroscopy according to the following procedure. First, a carbon fiber from which a sizing agent and the like attached to the carbon fiber surface have been removed with a solvent, is cut to 20 mm and spread over a sample support table made of copper. Using AlKα$_{1,2}$ as the X-ray source, measurement is performed while maintaining the inside of the sample chamber at $1 \times 10^{-8}$ Torr, and at a photoelectron take-off angle of 45°. As a correction value of a peak associated with electrification during the measurement, the binding energy value of the main peak of $C_{1s}$ is set to 285 eV. The $C_{1s}$ peak area is determined by drawing a straight baseline with a binding energy value in the range of 275 to 290 eV. The $O_{1s}$ peak area is determined by drawing a straight baseline with a binding energy value in the range of 525 to 540 eV.

Here, the surface oxygen concentration (O/C) is a value calculated as an atomic ratio using a device-specific sensitivity correction value from the ratio of the above $O_{1s}$ peak area to the $C_{1s}$ peak area.

The surface hydroxyl group concentration (COH/C) can be determined by chemical modification X-ray photoelectron spectroscopy according to the following procedure.

A carbon fiber from which a sizing agent and the like have been removed with a solvent, is cut and spread over a sample support table made of platinum, and exposed in dry nitrogen gas containing 0.04 mol/L trifluoroacetic acid anhydride at room temperature for 10 minutes to be chemically modified, then mounted on an X-ray photoelectron spectrometer at a photoelectron take-off angle of 35°. Using $AlK\alpha_{1,2}$ as the X-ray source, the inside of the sample chamber is maintained at a vacuum degree of $1\times10^{-8}$ Torr. As a correction of a peak associated with electrification during the measurement, first, the binding energy value of the main peak of $C_{1s}$ is set to 285 eV. The $C_{1s}$ peak area $[C_{1s}]$ is determined by drawing a straight baseline with a binding energy value in the range of 282 to 296 eV, and the $F_{1s}$ peak area $[F_{1s}]$ is determined by drawing a straight baseline with a binding energy value in a range of 682 to 695 eV. Also, a reaction rate r is determined from a $C_{1s}$ peak division of the chemically modified polyvinyl alcohol at the same time.

The surface hydroxyl group concentration (COH/C) is calculated from the following equation.

$$COH/C=\{[F_{1s}]/(3k[C_{1s}]-2[F_{1s}])r\}$$

Here, k is a sensitivity correction value of a $F_{1s}$ peak area with respect to a $C_{1s}$ peak area specific to a device.

The surface carboxyl group concentration (COOH/C) can be determined by chemical modification X-ray photoelectron spectroscopy according to the following procedure.

First, a carbon fiber from which a sizing agent and the like have been removed with a solvent, is cut and spread over a sample support table made of platinum, and exposed in an air containing 0.02 mol/L ethanol trifluoride gas, 0.001 mol/L dicyclohexylcarbodiimide gas and 0.04 mol/L pyridine gas at 60° C. for 8 hours to be chemically modified, then mounted on an X-ray photoelectron spectrometer at a photoelectron take-off angle of 35°. Using $AlK\alpha_{1,2}$ as the X-ray source, the inside of the sample chamber is maintained at a vacuum degree of $1\times10^{-8}$ Torr. As a correction of a peak associated with electrification during the measurement, first, the binding energy value of the main peak of $C_{1s}$ is set to 285 eV. The $C_{1s}$ peak area $[C_{1s}]$ is determined by drawing a straight baseline with a binding energy value in the range of 282 to 296 eV, and the $F_{1s}$ peak area $[F_{1s}]$ is determined by drawing a straight baseline with a binding energy value in a range of 682 to 695 eV. Also, a reaction rate r is determined from a $C_{1s}$ peak division of the chemically modified polyacrylic acid at the same time, and a residual rate m of a dicyclohexylcarbodiimide derivative is determined from an $O_{1s}$ peak division.

The surface carboxyl group concentration (COOH/C) is calculated from the following equation.

$$COOH/C=\{[F_{1s}]/(3k[C_{1s}]-(2+13m)[F_{1s}])r\}$$

Here, k is a sensitivity correction value of a $F_{1s}$ peak area with respect to a $C_{1s}$ peak area specific to a device.

Next, the sizing agent used in the tubular carbon fiber reinforced composite material of the present invention will be described.

It is preferable that the sizing agent B of the present invention contains one kind or more epoxy resins. A sizing agent containing an epoxy resin is preferred since it firmly adheres to the surface functional group of a carbon fiber, and also have a strong interaction with a matrix resin, especially an epoxy resin, and the interlaminar shear strength of the carbon fiber reinforced composite material is improved.

It is preferable that the sizing agent B contains a total of epoxy resins in an amount of 30 parts by mass or more, per 100 parts by mass of the sizing agent. It is preferable to contain a total of epoxy resins in an amount of 30 parts by mass or more, whereby adhesion is improved, and the interlaminar shear strength is improved. The sizing agent B contains a total of epoxy resins in an amount of more preferably 70 parts by mass or more, and further preferably 85 parts by mass or more.

In the present invention, the epoxy equivalent of the sizing agent B is preferably 350 g/mol or less. Herein, the epoxy equivalent refers to an epoxy equivalent of the sizing agent before applied to a carbon fiber. When the epoxy equivalent is 350 g/mol or less, the density of epoxy groups present in the carbon fiber surface is increased. Therefore, an interaction with the carbon fiber is increased, adhesion between the carbon fiber and the cured product of a thermosetting resin is improved, and the interlaminar shear strength is improved. The epoxy equivalent is more preferably 270 g/mol or less, and further preferably 180 g/mol or less.

In the present invention, the epoxy resin used in the bias layer preferably has three or more epoxy groups in the molecule. When the epoxy resin has three or more epoxy groups in the molecule, even when one epoxy group interacts with an oxygen-containing functional groups on the carbon fiber surface, remaining epoxy groups interact with a thermosetting resin, whereby adhesion is improved, and high interlaminar shear strength is exhibited. Although the upper limit of the number of the epoxy groups is not particularly set, adhesion may be saturated in the case of 10 or more groups.

In the present invention, the epoxy equivalent of the epoxy resin used in the bias layer is preferably 250 g/mol or less. Herein, the epoxy equivalent refers to an epoxy equivalent of the epoxy resin before applied to a carbon fiber. When the epoxy equivalent is 250 g/mol or less, the epoxy equivalent of the total sizing agent is lowered, and the density of epoxy groups present in the carbon fiber surface is increased. Therefore, an interaction with the carbon fiber is increased, adhesion between the carbon fiber and the cured product of a thermosetting resin is improved, and the interlaminar shear strength is improved. The epoxy equivalent is more preferably 200 g/mol or less, and further preferably 180 g/mol or less. Although the lower limit of the epoxy equivalent is not particularly set, the effect of improving adhesion may be saturated in the case of 90 g/mol or more.

In the present invention, the epoxy resin used in the bias layer is preferably an aliphatic epoxy resin.

The aliphatic epoxy resin is an epoxy resin containing no aromatic ring in the molecule. The aromatic ring is a cyclic chemical skeleton which has electron conjugation and exhibits aromaticity. The aliphatic epoxy resin has a flexible skeleton with a high degree of freedom, thus has a strong interaction with a carbon fiber. As a result, adhesion is improved, and the interlaminar shear strength is improved, thus it is preferred.

Examples of the aliphatic epoxy resin of the present invention include glycidyl-ether-type epoxy compounds derived from a polyol, glycidyl-amine-type epoxy compounds derived from an amine having a plurality of active hydrogens, glycidyl-ester-type epoxy resins derived from a polycarboxylic acid, and epoxy resins obtained by oxidizing a compound having a plurality of double bonds in a molecule.

Examples of aliphatic glycidyl-amine-type epoxy resin include epoxy resins obtained by glycidylating 1,3-bis(aminomethyl)cyclohexane.

Examples of aliphatic glycidyl-ester-type epoxy resin include glycidyl-ester-type epoxy resins obtained by reacting dimer acid with epichlorohydrin.

Examples of aliphatic epoxy resin obtained by oxidizing a compound having a plurality of double bonds in a molecule include epoxy resins having an epoxycyclohexane ring in a molecule. Further, examples of this epoxy resin include epoxidized soybean oils.

Examples of aliphatic epoxy resin include, other than these epoxy resins, epoxy resins such as triglycidyl isocyanurate.

The aliphatic epoxy resin preferably has at least one or more epoxy groups, and at least one or more functional groups selected from a group consisting of a hydroxyl group, an amide group, an imide group, a urethane group, a urea group, a sulfonyl group, a carboxyl group, an ester group and a sulfo group. Specific examples of epoxy resin include compounds having an epoxy group and a hydroxyl group, compounds having an epoxy group and an amide group, compounds having an epoxy group and an imide group, compounds having an epoxy group and a urethane group, compounds having an epoxy group and a urea group, compounds having an epoxy group and a sulfonyl group, and compounds having an epoxy group and a sulfo group.

Examples of compounds having a hydroxyl group in addition to an epoxy group include sorbitol-type polyglycidyl ethers, glycerol-type polyglycidyl ethers, and the like, and specific examples include "Denacol®" EX-611, EX-612, EX-614, EX-614B, EX-622, EX-512, EX-521, EX-421, EX-313, EX-314 and EX-321 (manufactured by Nagase ChemteX Corporation), and the like.

Examples of compounds having an amide group in addition to an epoxy group include amide-modified epoxy resins and the like. Amide-modified epoxy resin can be obtained by reacting a carboxyl group of aliphatic dicarboxamide with an epoxy group of an epoxy resin having two or more epoxy groups.

Examples of compounds having a urethane group in addition to an epoxy group include urethane-modified epoxy resins, and specific examples include "Adeka Resin®" EPU-78-13S, EPU-6, EPU-11, EPU-15, EPU-16A, EPU-16N, EPU-17T-6, EPU-1348 and EPU-1395 (manufactured by ADEKA CORPORATION), and the like. Alternatively, a compound having a urethane group in addition to an epoxy group can be obtained by reacting a polyvalent isocyanate in a reaction equivalent to the hydroxyl group amount with a terminal hydroxyl group of polyethylene oxide monoalkyl ether, and then reacting a hydroxyl group in the polyvalent epoxy resin with an isocyanate residue of the obtained reaction product. Examples of the polyvalent isocyanate used herein include hexamethylene diisocyanate, isophorone diisocyanate, norbornane diisocyanate, and the like.

Examples of compounds having a urea group in addition to an epoxy group include urea-modified epoxy resins and the like. Urea-modified epoxy resin can be obtained by reacting a carboxyl group of aliphatic urea dicarboxylic acid with an epoxy group of an epoxy resin having two or more epoxy groups.

The aliphatic epoxy resin is, among those described above, more preferably glycidyl ether epoxy obtained by the reaction of at least one member selected from the group consisting of glycerol, diglycerol, polyglycerol, trimethylolpropane, pentaerythritol, sorbitol and arabitol, with epichlorohydrin, in terms of high adhesion.

Also, the sizing agent B of the present invention can use, other than the aliphatic epoxy resins described above, an aromatic epoxy resin containing aromatic in a molecule. Specific examples include glycidyl-ether-type epoxy resins derived from a polyol, glycidyl-amine-type epoxy resins derived from an amine having a plurality of active hydrogens, and glycidyl-ester-type epoxy resins derived from a polycarboxylic acid.

Examples of glycidyl-ether-type epoxy resins include glycidyl-ether-type epoxy resins obtained by the reaction of bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, and tetrakis(p-hydroxyphenyl)ethane, with epichlorohydrin.

Examples of glycidyl-amine-type epoxy resin include N,N-diglycidyl aniline and N,N-diglycidyl-o-toluidine. Furthermore, examples of glycidyl-amine-type epoxy resin include compounds obtained by glycidylating m-xylylenediamine, m-phenylenediamine, 4,4'-diaminodiphenylmethane, and 9,9-bis(4-aminophenyl)fluorene.

Further, examples of glycidyl-amine-type epoxy resin include epoxy resins obtained by glycidylating both the hydroxyl group and amino group of an aminophenol such as m-aminophenol, p-aminophenol, and 4-amino-3-methylphenol.

Examples of glycidyl-ester-type epoxy resin include glycidyl-ester-type epoxy resins obtained by reacting phthalic acid, terephthalic acid, hexahydrophthalic acid or the like, with epichlorohydrin.

Examples of epoxy resin include, other than these epoxy resins, epoxy resins such as triglycidyl isocyanurate. Furthermore, examples of epoxy resin include epoxy resins synthesized using the epoxy resins listed above as raw materials, for example, epoxy resins synthesized by oxazolidone ring formation reaction of bisphenol A diglycidyl ether and tolylene diisocyanate.

The sizing agent S of the present invention can use the aliphatic epoxy resins described above and the aromatic epoxy resins described above, and preferably contains an aliphatic epoxy resin, in terms of improving interlaminar shear strength. Particularly, the sizing agent S is more preferably glycidyl ether epoxy obtained by the reaction of at least one member selected from the group consisting of glycerol, diglycerol, polyglycerol, trimethylolpropane, pentaerythritol, sorbitol and arabitol, with epichlorohydrin.

In addition, for the purpose of increasing adhesion between the carbon fiber and the cured product of a thermosetting resin, a component for promoting adhesion can be added to the sizing agent S and/or sizing agent B of the present invention. These components are preferably dissolved in a solvent in which the epoxy resin is dissolved or dispersed, and are used as a uniform sizing agent solution.

An example of the component for promoting adhesion includes tertiary amine compounds such as triisopropylamine, dibutylethanolamine, diethylethanolamine, triisopropanolamine, diisopropylethylamine, N-benzylimidazole, 1,8-diazabicyclo[5,4,0]-7-undecene, 1,5-diazabicyclo[4,3,0]-5-nonene, 1,4-diazabicyclo[2,2,2]octane, and 5,6-dibutylamino-1,8-diazabicyclo[5,4,0]-undecene-7 and salts thereof, quaternary phosphonium salts such as phosphine compounds such as tributylphosphine and triphenylphosphine and salts thereof, and the like. It is preferred that these compounds be blended in an amount of preferably 1 to 25 mass % and further preferably 2 to 15 mass %, relative to the total amount of the sizing agent used in the present invention.

In the present invention, in addition to the sizing agent S and/or sizing agent B, as additives such as surfactants, it is preferable to use, for example, polyalkylene oxides such as polyethylene oxide and polypropylene oxide, compounds such as a higher alcohol, a polyhydric alcohol, an alkylphenol, a styrenated phenol, and the like added with a polyalkylene oxide such as polyethylene oxide or polypropylene oxide, and nonionic surfactants such as a block copolymer of ethylene oxide and propylene oxide. In addition, without affecting the effects of the present invention, a polyester resin, an unsaturated polyester compound, and the like may also be suitably added.

In the present invention, the amount of the sizing agent S and/or sizing agent B attached to the carbon fiber is preferably in the range of 0.1 to 10 parts by mass per 100 parts by mass of the carbon fiber. When the amount of attached sizing agent is 0.1 parts by mass or more, the carbon fiber coated with the sizing agent can resist abrasion of passing metal guide and the like when subjected to prepreg formation and the like, and generation of fluff is suppressed, thus a tubular carbon fiber reinforced composite material production process is stabilized. Meanwhile, when the amount of attached sizing agent is 10 parts by mass or less, the thermosetting resin is impregnated into the carbon fiber without being inhibited by a sizing agent film around the carbon fiber, and void formation is suppressed in the obtained composite material, thus the carbon fiber reinforced composite material has excellent quality, and excellent mechanical physical properties at the same time. The amount of attached sizing agent is more preferably in the range of 0.2 to 3 parts by mass. At this time, it is preferable that the concentration/temperature of the sizing agent solution, the yarn tension and the like are controlled in order for the amount of sizing agent components attached to the carbon fiber to be within the appropriate range. As the concentration of the sizing agent solution, it is preferable to use a solution having sizing agent components at 0.1 mass % or more and 20 mass % or less, and more preferably 0.2 mass % or more and 5 mass % or less.

The thermosetting resin used in the present invention will be described.

It is preferable that the thermosetting resin S of the present invention contains one kind or more epoxy resins. The elastic modulus of a cured product of the epoxy resin is high, thus the cylinder bending strength of a tubular carbon fiber reinforced composite material is improved.

The epoxy resin used in the straight layer of the present invention is preferably at least one kind of epoxy resins selected from aminophenol-type epoxy resins, tetraglycidyldiaminodiphenylmethane, solid bisphenol F epoxy resins, diglycidyl aniline, and triphenylmethane-type epoxy resins. These epoxy resins are used, whereby the elastic modulus of a cured product is improved.

As an amino phenol-type epoxy resin, "Araldite®" MY0500, MY0510, MY0600 (manufactured by Huntsman Advanced Materials), "jER®" 630 (manufactured by Mitsubishi Chemical Corporation) or the like can be used.

As tetraglycidyldiaminodiphenylmethane, "SUMI-EP-DXY®" ELM434 (manufactured by Sumitomo Chemical Co., Ltd.), YH434L (manufactured by NIPPON STEEL & SUMIKIN CHEMICAL CO., LTD.), "jER®" 604 (manufactured by Mitsubishi Chemical Corporation), "Araldite®" MY720, MY721 (manufactured by Huntsman Advanced Materials) or the like can be used.

Examples of a commercially available product of solid bisphenol F epoxy resin include "jER®" 4007P, "jER®" 4010P, "jER®" 4004P (all manufactured by Mitsubishi Chemical Corporation), YDF2001, YDF2004 (both manufactured by NIPPON STEEL & SUMIKIN CHEMICAL CO., LTD.), and the like.

Examples of a commercially available product of diglycidyl aniline include GAN and GOT (both manufactured by Nippon Kayaku Co., Ltd.).

Examples of a commercially available product of triphenylmethane-type epoxy resin include "jER®" 1032 H60 (manufactured by Mitsubishi Chemical Corporation) and the like.

It is preferable that the thermosetting resin B of the present invention contains an epoxy resin. An epoxy resin is used, whereby the interlaminar shear strength is improved.

The epoxy resin used in the bias layer of the present invention is preferably at least one kind of epoxy resins selected from aminophenol-type epoxy resins, tetraglycidyldiaminodiphenylmethane, solid bisphenol F epoxy resins, diglycidyl aniline, and triphenylmethane-type epoxy resins. These epoxy resins are used, whereby the interlaminar shear strength is improved.

In addition, a curing agent can be blended to the thermosetting resin S and/or thermosetting resin B of the present invention in order to heating and curing an epoxy resin. Examples of the curing agent include amines such as aromatic amines and alicyclic amines, acid anhydrides, polyaminoamides, organic acid hydrazides, isocyanates, and the like, and among them, amine curing agents are preferred since they have excellent dynamic characteristics and heat resistance, and diaminodiphenylsulphone or diaminodiphenylmethane, that is an aromatic amine, dicyandiamide or a derivative thereof, a hydrazide compound or the like can be used. Examples of a commercially available product of dicyandiamide include DICY-7, DICY-15 (both manufactured by Mitsubishi Chemical Corporation), and the like. The derivative of dicyandiamide is one obtained by combining various compounds with dicyandiamide, and examples include reaction products with an epoxy resin, reaction products of a vinyl compound and an acrylic compound, and the like.

Moreover, it is preferred that the total amount of the curing agent is an amount such that the active hydrogen group is in the range of 0.6 to 1.2 equivalent, relative to epoxy groups of the total epoxy resin components. When the amount of the active hydrogen group is less than 0.6 equivalent, the reaction rate, heat resistance and elastic modulus of a cured product of the thermosetting resin are insufficient, and the glass transition temperature and strength of the carbon fiber reinforced composite material may be insufficient. Also, when the active hydrogen group exceeds 1.2 equivalent, the reaction rate, glass transition temperature and elastic modulus of a cured product of the thermosetting resin are sufficient, but plastic deformability is insufficient, thus physical properties such as impact resistance of the carbon fiber reinforced composite material may be insufficient. It is more preferred that the total amount of the curing agent is an amount such that the active hydrogen group is in the range of 0.7 to 1.0 equivalent.

Each curing agent may be used in combination with a curing accelerator and other curing agent of epoxy resins. Examples of curing accelerator used in combination include ureas, imidazoles, Lewis acids, and the like.

As the urea compound, for example, N,N-dimethyl-N'-(3,4-dichlorophenyl)urea, toluene bis(dimethylurea), 4,4'-methylene bis(phenyldimethylurea), 3-phenyl-1,1-dimethylurea or the like can be used. Examples of a commercially available product of the urea compound include DCMU99 (manufactured by Hodogaya Chemical Co., Ltd.), "Omicure®" 24, 52, 94 (all manufactured by CVC SpecialtyChemicals, Inc.), and the like.

Examples of a commercially available product of imidazoles include 2MZ, 2PZ, 2E4MZ (all manufactured by SHIKOKU CHEMICALS CORPORATION), and the like. Examples of Lewis acids include complexes of a boron halide and a base, such as boron trifluoride-piperidine complexes, boron trifluoride-monoethylamine complexes, boron trifluoride-triethanolamine complexes, and boron trichloride-octylamine complexes.

Among them, from the viewpoint of the balance between preservation stability and curing accelerating capacity, a urea compound is preferably used. The blending amount of the urea compound is preferably 1 to 5 parts by mass, per 100 parts by mass of the total epoxy resin components. The blending amount of the urea compound is set within the above range, a cured product having excellent the elastic modulus and heat resistance can be obtained.

In addition, for the purpose of adjusting viscoelasticity to improve workability or heat resistance of a cured product of the thermosetting resin, an epoxy resin other than tetraglycidyldiaminodiphenylmethane, aminophenol-type epoxy resins, solid bisphenol F-type epoxy resins, diglycidyl aniline, and triphenylmethane-type epoxy resins can be added to the thermosetting resin S and/or thermosetting resin B of the present invention, within the range that the effect of the present invention is not impaired. Only one kind of them may be added, and also they may be added in a combination of a plurality of kinds. Specific examples include phenol novolac-type epoxy resins, cresol novolac epoxy resins, resorcinol-type epoxy resins, phenol aralkyl-type epoxy resins, dicyclopentadiene-type epoxy resins, epoxy resins having a biphenyl skeleton, isocyanate-modified epoxy resins, anthracene-type epoxy resins, polyethylene glycol-type epoxy resins, liquid bisphenol A-type epoxy resins, solid bisphenol A-type epoxy resins, liquid bisphenol F-type epoxy resins, and the like.

Also, in order to control viscoelasticity, and improve tackiness and drape characteristics of a prepreg, and dynamic characteristics such as impact resistance of a carbon fiber reinforced composite material, a thermoplastic resin, an acrylic resin, organic particles such as rubber particles and thermoplastic resin particles, inorganic particles or the like can be blended to the thermosetting resin of the present invention.

As the thermoplastic resin, a thermoplastic resin having a hydrogen bonding functional group in which the effect of improving adhesion to a carbon fiber can be expected is preferably used. Examples of a hydrogen bonding functional group include an alcoholic hydroxyl group, an amide bond, a sulfonyl group, a carboxyl group, and the like.

Examples of a thermoplastic resin having an alcoholic hydroxyl group include polyvinyl acetal resins such as polyvinyl formal and polyvinyl butyral, polyvinyl alcohols, phenoxy resins, and the like. Examples of a thermoplastic resin having an amide bond include polyamide, polyimide, polyamideimide, polyvinylpyrrolidone, and the like. Examples of a thermoplastic resin having a sulfonyl group include polysulfone and the like. Polyamide, polyimide and polysulfone may have a functional group such as an ether bond or a carbonyl group in a main chain. Polyamide may have a substituent in a nitrogen atom of an amide group. Examples of a thermoplastic resin having a carboxyl group include polyester, polyamide, polyamideimide, and the like.

As thermoplastic resin particles, polyamide particles and polyimide particles are suitably used. Among them, polyamide is particularly preferable. Among polyamides, Nylon 12, Nylon 6, Nylon 11, Nylon 66, Nylon 6/12 copolymers, and a nylon (semi-IPN nylon) modified to have a semi-IPN (polymer interpenetrating network) with an epoxy resin described in Example 1 of Japanese Patent Laid-open Publication No. 1-104624 impart particularly excellent adhesive strength with an epoxy resin. The thermoplastic resin particles may have the shape of spherical particles, non-spherical particles, or porous particles. However, because a spherical shape prevents a decrease in flow characteristics of the resin, resulting in excellent viscoelasticity, and also does not provide a starting point for stress concentration, offering high impact resistance, the particles are spherical in a preferred mode.

Next, a method for producing a carbon fiber used in the present invention will be described.

As the spinning method for obtaining a precursor fiber of the carbon fiber S and/or carbon fiber B, a spinning method such as a wet process, a dry process, or a dry-wet process may be used. Among them, from the viewpoint of easily obtaining a carbon fiber with high strength, a wet process or a dry-wet process is preferably used. In the case of producing a PAN-based carbon fiber, a solution or suspension of a polyacrylonitrile homopolymer or copolymer can be used as a spinning dope.

The above spinning dope is spun through a nozzle, solidified, washed with water, and extended to form a precursor fiber, and the obtained precursor fiber is subjected to a flame-proof treatment and a carbonization treatment, and further to a graphitization treatment as necessary, thereby giving a carbon fiber. As the conditions for the carbonization treatment and the graphitization treatment, it is preferable that the maximum heat treatment temperature is 1,100° C. or more, and more preferably 1,400 to 3,000° C.

In the carbon fiber S and/or carbon fiber B of the present invention, from the viewpoint of obtaining a carbon fiber with high strength and high elastic modulus, a carbon fiber with small fineness is preferably used. Specifically, the single fiber diameter of carbon fiber is preferably 7.5 µm or less. The lower limit of the single fiber diameter is not particularly set, but in a single fiber diameter of 4.5 µm or less, single fiber cutting is likely to occur in the process, and productivity may be lowered.

In order to improve the adhesion to a cured product of the thermosetting resin, the obtained carbon fiber is usually subjected to an oxidation treatment, thereby introducing oxygen-containing functional groups. As the oxidation treatment method, gas-phase oxidation, liquid-phase oxidation and liquid-phase electrolytic oxidation are used. However, in terms of offering high productivity and allowing the fiber to be uniformly treated, it is preferable to use liquid-phase electrolytic oxidation.

In the carbon fiber S and/or carbon fiber B of the present invention, examples of electrolyte solutions for use in liquid-phase electrolytic oxidation include acidic electrolyte solutions and alkaline electrolyte solutions.

Examples of acidic electrolyte solutions include inorganic acids such as sulfuric acid, nitric acid, hydrochloric acid, phosphoric acid, boric acid, and carbonic acid, organic acids such as acetic acid, butanoic acid, oxalic acid, acrylic acid, and maleic acid, and salts such as ammonium sulfate and ammonium hydrogen sulfate. Among them, sulfuric acid and nitric acid, which show strong acidity, are preferably used.

Specific examples of alkaline electrolyte solutions include aqueous solutions of hydroxides such as sodium hydroxide, potassium hydroxide, magnesium hydroxide, calcium hydroxide, and barium hydroxide, aqueous solutions of carbonates such as sodium carbonate, potassium carbonate, magnesium carbonate, calcium carbonate, barium carbonate, and ammonium carbonate, aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate, aqueous solutions of ammonia, a tetraalkylammonium hydroxide, and hydrazine, and the like. Among them, it is preferable to use an aqueous solution of ammonium carbonate or ammonium hydrogen carbonate or an aqueous solution of a tetraalkylammonium hydroxide showing strong alkalinity, from the viewpoint that they do not contain an alkali metal.

It is preferable that the concentration of the electrolyte solution used in the carbon fiber S and/or carbon fiber B of the present invention is within a range of 0.01 to 5 mol/L. When the concentration of the electrolyte solution is 0.01 mol/L or more, the electrolytic treatment voltage can be reduced, which is advantageous in terms of operation cost. Meanwhile, when the concentration of the electrolyte solution is 5 mol/L or less, this is advantageous in terms of safety. The concentration of the electrolyte solution is more preferably within the range of 0.1 to 1 mol/L.

It is preferable that the temperature of the electrolyte solution used in the carbon fiber S and/or carbon fiber B of the present invention is within the range of 10° C. to 100° C. When the temperature of the electrolyte solution is 10° C. or more, the efficiency of electrolytic treatment is improved, which is advantageous in terms of operation cost. Meanwhile, when the temperature of the electrolyte solution is 100° C. or less, it is advantageous in terms of safety. The temperature of the electrolyte solution is more preferably within the range of 10° C. to 40° C.

In the carbon fiber S and/or carbon fiber B of the present invention, it is preferable that the quantity of electricity in liquid-phase electrolytic oxidation is optimized according to the carbonization degree of the carbon fiber, and when treating a carbon fiber having a high elastic modulus, a larger quantity of electricity is required.

In the carbon fiber S and/or carbon fiber B of the present invention, it is preferable that the current density during liquid-phase electrolytic oxidation is in the range of 1.5 to 1,000 A/m$^2$ per m$^2$ of the surface area of the carbon fiber in the electrolytic treatment liquid. When the current density is 1.5 A/m$^2$ or more, the efficiency of electrolytic treatment is improved, which is advantageous in terms of operation cost. Meanwhile, when the current density is 1,000 A/m$^2$ or less, it is advantageous in terms of safety. The current density is more preferably within the range of 3 to 500 A/m$^2$.

In the carbon fiber S and/or carbon fiber B of the present invention, the carbon fiber, after being subjected to an electrolytic treatment, is preferably washed with water and dried. In this case, the carbon fiber is preferably dried at the lowest possible temperature because an excessively high drying temperature is likely to cause a thermal decomposition and elimination of functional groups at the outermost surface of the carbon fiber. Specifically, the drying temperature is preferably 250° C. or less, and more preferably 210° C. or less.

Examples of application techniques of the sizing agent S and/or sizing agent B to a carbon fiber include a method in which a carbon fiber is immersed in a sizing liquid through a roller, a method in which a carbon fiber is brought into contact with a roller having a sizing liquid attached thereto, a method in which a sizing agent solution is sprayed in mist form to a carbon fiber, and the like. In addition, although the sizing agent may be applied in a batch-wise manner or a continuous manner, the continuous manner, which can achieve high productivity and small unevenness, is suitably used. At this time, it is preferable that the concentration/temperature of the sizing liquid, the yarn tension and the like are controlled in order for the amount of sizing agent active ingredient uniformly attached to the carbon fiber to be within the appropriate range. It is also preferable to excite the carbon fiber by ultrasonic waves during the application of the sizing agent.

In the carbon fiber S and/or carbon fiber B of the present invention, a sizing agent can be diluted with a solvent and used. Examples of such solvent include water, methanol, ethanol, 2-propanol, acetone, methyl ethyl ketone, dimethylformamide, and dimethylacetamide. Among them, water, which is easy to handle and advantageous in terms of safety, is suitably used.

In the carbon fiber S and/or carbon fiber B of the present invention, from the viewpoint of removing a solvent contained in a sizing agent after coating a carbon fiber with the sizing agent, heat treatment is performed, preferably in the temperature range of 160 to 260° C. for 30 to 600 seconds, more preferably in the temperature range of 170 to 250° C. for 30 to 500 seconds, and further preferably in the temperature range of 180 to 240° C. for 30 to 300 seconds.

Next, a method for producing a tubular carbon fiber reinforced composite material will be described.

The tubular carbon fiber reinforced composite material of the present invention is characterized by being a tubular carbon fiber reinforced composite material comprising a cylindrical body or prismatic body having a hollow structure or the like. Namely, the tubular carbon fiber reinforced composite material of the present invention forms a pipe body structure, regardless of its cross sectional shape.

The tubular carbon fiber reinforced composite material of the present invention can be produced via so-called prepreg, obtained by impregnating a fiber base material with a thermosetting resin.

Example of the method for preparing a prepreg sheet by impregnating a carbon fiber with a thermosetting resin can include a wet process in which the above matrix resin is dissolved in a solvent such as methyl ethyl ketone or methanol to reduce the viscosity, followed by impregnation, or a hot-melt process (dry process) in which the resin is heated to reduce the viscosity, followed by impregnation, and the like.

The wet method is a method of immersing a carbon fiber in a solution of a thermosetting resin, then taking out the carbon fiber and evaporating a solvent using an oven or the like, and the hot melt method is a method of directly impregnating a carbon fiber with a thermosetting resin heated to reduce the viscosity, or a method of preparing a film obtained by once applying a thermosetting resin on a release paper or the like, then superposing the film on the both sides or one side of a carbon fiber, and heating and pressing the laminate to impregnate the carbon fiber with the resin. The hot-melt process is preferred since no solvent is substantially remained in the prepreg.

The carbon fiber reinforced composite material according to the present invention is prepared by a method of shaping and/or laminating a prepreg, and then heating and curing a resin while applying pressure on a shaped product and/or laminated product, or the like.

As a method for applying heat and pressure, a press-molding method, an autoclave molding method, a bagging molding method, a wrapping tape method, an internal-pressure molding method or the like can be properly used.

The wrapping tape method is a method in which a prepreg is wound on a core bar such as mandrel, to form tubular carbon fiber reinforced composite material, and this method is preferably used when preparing a tubular carbon fiber reinforced composite material such as a golf club shaft or fishing rod. More specifically, it is a method in which a prepreg is wound on a mandrel, and a wrapping tape is wound on the outside of the prepreg, in order to fix the prepreg and apply pressure, and after heating and curing the thermosetting resin in an oven, the core bar is removed to obtain a tubular carbon fiber reinforced composite material.

Also, the internal pressure molding method is a method in which a preform formed of an internal pressure-applying body such as a tube wound with a prepreg is fixed in a mold, and high pressure gas is introduced into the internal pressure-applying body to apply pressure and heat the mold simultaneously to mold a tubular carbon fiber reinforced composite material.

The tubular carbon fiber reinforced composite material of the present invention is suitably used in sports uses, aerospace applications and general industrial applications. More specifically, in sports uses, the tubular carbon fiber reinforced composite material of the present invention is suitably used for a golf club shaft, a fishing rod, rackets of tennis and badminton, sticks for hockey and the like, and skiing pole. Furthermore, in general industrial applications, the tubular carbon fiber reinforced composite material of the present invention is suitably used for structural members of mobiles such as automobiles, ships and railroad vehicles, drive shaft, roller for paper manufacture, mending/reinforcing materials, and the like. Among them, the tubular carbon fiber reinforced composite material of the present invention can be suitably used for a golf club shaft, a fishing rod, and the like.

EXAMPLES

Hereinbelow, the present invention will be described in detail with reference to examples. However, the present invention is not limited to these examples.

Surface Oxygen Concentration (O/C) of Carbon Fiber

The surface oxygen concentration of the carbon fiber was determined by X-ray photoelectron spectroscopy according to the following procedure. First, a carbon fiber from which a sizing agent and the like attached to the carbon fiber surface had been removed with a solvent, was cut to 20 mm and spread over a sample support table made of copper. Using $AlK\alpha_{1,2}$ as the X-ray source, X-ray photoelectron spectroscopy measurement was performed while maintaining the inside of the sample chamber at $1\times10^{-8}$ Torr, and at a photoelectron take-off angle of 45°. As a correction of a peak associated with electrification during the measurement, the binding energy value of the main peak of $C_{1s}$ was set to 285 eV. The $C_{1s}$ peak area was determined by drawing a straight baseline in the range of 275 to 290 eV as a binding energy value. The $O_{1s}$ peak area was determined by drawing a straight baseline in the range of 525 to 540 eV as a binding energy.

Here, the surface oxygen concentration is a value calculated as an atomic ratio using a device-specific sensitivity correction value from the ratio of the above $O_{1s}$ peak area to the $C_{1s}$ peak area. ESCA-1600 manufactured by ULVAC-PHI was used as the X-ray photoelectron spectroscopy device.

Surface Hydroxyl Group Concentration (COH/C) and Surface Carboxyl Group Concentration (COOH/C) of Carbon Fiber The surface hydroxyl group concentration (COH/C) was determined by chemical modification X-ray photoelectron spectroscopy according to the following procedure.

A carbon fiber from which a sizing agent and the like have been removed with a solvent, is cut and spread over a sample support table made of platinum, and exposed in dry nitrogen gas containing 0.04 mol/L trifluoroacetic acid anhydride at room temperature for 10 minutes to be chemically modified, then mounted on an X-ray photoelectron spectrometer at a photoelectron take-off angle of 35°. Using $AlK\alpha_{1,2}$ as the X-ray source, the inside of the sample chamber is maintained at a vacuum degree of $1\times10^{-8}$ Torr. As a correction of a peak associated with electrification during the measurement, first, the binding energy value of the main peak of $C_{1s}$ is set to 285 eV. The $C_{1s}$ peak area $[C_{1s}]$ was determined by drawing a straight baseline in a range of 282 to 296 eV, and the $F_{1s}$ peak area $[F_{1s}]$ was determined by drawing a straight baseline in a range of 682 to 695 eV. Also, a reaction rate r was determined from a $C_{1s}$ peak division of the chemically modified polyvinyl alcohol at the same time.

The surface hydroxyl group concentration (COH/C) was represented by the value calculated from the following equation.

$$COH/C=\{[F_{1s}]/(3k[C_{1s}]-2[F_{1s}])r\}$$

Here, k is a sensitivity correction value of a $F_{1s}$ peak area with respect to a $C_{1s}$ peak area specific to a device, and the sensitivity correction value specific to a device in model SSX-100-206 manufactured by Surface Science Instruments, USA was 3.919.

The surface carboxyl group concentration COOH/C was determined by chemical modification X-ray photoelectron spectroscopy according to the following procedure. First, a carbon fiber from which a sizing agent and the like have been removed with a solvent, is cut and spread over a sample support table made of platinum, and exposed in an air containing 0.02 mol/L ethanol trifluoride gas, 0.001 mol/L dicyclohexylcarbodiimide gas and 0.04 mol/L pyridine gas at 60° C. for 8 hours to be chemically modified, then mounted on an X-ray photoelectron spectrometer at a photoelectron take-off angle of 35°. Using $AlK\alpha_{1,2}$ as the X-ray source, the inside of the sample chamber is maintained at a vacuum degree of $1\times10^{-8}$ Torr. As a correction of a peak associated with electrification during the measurement, first, the binding energy value of the main peak of $C_{1s}$ is set to 285 eV. The $C_{1s}$ peak area $[C_{1s}]$ was determined by drawing a straight baseline in a range of 282 to 296 eV, and the $F_{1s}$ peak area $[F_{1s}]$ was determined by drawing a straight baseline in a range of 682 to 695 eV. Also, a reaction rate r was determined from a $C_{1s}$ peak division of the chemically modified polyacrylic acid at the same time, and a residual rate m of a dicyclohexylcarbodiimide derivative was determined from an $O_{1s}$ peak division.

The surface carboxyl group concentration COOH/C was represented by the value calculated from the following equation.

$$COOH/C=\{[F_{1s}]/(3k[C_{1s}]-(2+13m)[F_{1s}])r\}\times100$$

Here, k is a sensitivity correction value of a $F_{1s}$ peak area with respect to a $C_{1s}$ peak area specific to a device, and the sensitivity correction value specific to a device when using model SSX-100-206 manufactured by Surface Science Instruments, USA was 3.919.

Bending Elastic Modulus of Cured Product of Thermosetting Resin

An uncured thermosetting resin was degassed in vacuum, then cured at a temperature of 130° C. for 2 hours, in a mold set such that the thickness was 2 mm by a spacer made of 2-mm-thick "Teflon®", to obtain a cured product of thermosetting resin with a thickness of 2 mm. A test piece with a width of 10 mm and a length of 60 mm was cut out from this cured product, and three-point bending was conducted according to JIS K7171 (1994), at a distance between spans of 32 mm, and a cross head speed of 2.5 mm/min, using a Universal Testing Instruments (manufactured by Instron), to obtain a bending elastic modulus. The bending elastic modulus was compared based on the average of the number of samples n of 5.

Interlaminar Shear Strength

Twelve layers of prepregs constituting the straight layer and/or the bias layer were laminated in 0° direction, and heated and cured in an autoclave at a temperature of 130° C., a pressure of 0.6 MPa for 2 hours, to obtain carbon fiber reinforced composite material plate. This carbon fiber reinforced composite material plate was cut out in a strip of 14 mm in length in 0° direction and 6.4 mm in the width direction, and a three-point bending test was conducted to obtain interlaminar shear strength, according to ASTM D2344.

Cylinder Bending Test of Tubular Carbon Fiber Reinforced Composite Material

Using a cylindrical CFRP with an internal diameter 6.3 mm, the bending fracture load was measured based on the three-point bending test method described in "Qualification Standards and Standard Confirmation Methods for Shafts for Golf Clubs" (Ed. by the Consumer Product Safety Committee, Minister for International Trade and Industry, Approval No. 5-SAN-2087, 1993), and the load value was used as a cylinder bending strength. The inter-fulcrum distance was set to 300 mm, and the testing rate was set to 5 mm/min.

Materials and components used in the examples and comparative examples are as follows.

A. Carbon Fibers (A-1) to (A-4)
(A-1) Carbon fiber 1 (surface oxygen concentration (O/C) =0.15, surface hydroxyl group concentration (COH/C) =0.016, surface carboxyl group concentration (COOH/C) =0.004)
(A-2) Carbon fiber 2 (surface oxygen concentration (O/C) =0.13, surface hydroxyl group concentration (COH/C) =0.015, surface carboxyl group concentration (COOH/C) =0.005)
(A-3) Carbon fiber 3 (surface oxygen concentration (O/C) =0.23, surface hydroxyl group concentration (COH/C) =0.02, surface carboxyl group concentration (COOH/C) =0.008)
(A-4) Carbon fiber 4 (surface oxygen concentration (O/C) =0.09, surface hydroxyl group concentration (COH/C) =0.003, surface carboxyl group concentration (COOH/C) =0.001)

B. Sizing Agents (B-1) to (B-6)
(B-1) "Denacol®" Ex-411 (manufactured by Nagase ChemteX Corporation)
Pentaerythritol polyglycidyl ether
Number of epoxy groups: 3.2, Epoxy equivalent: 230 g/mol
(B-2) "Denacol®" Ex-521 (manufactured by Nagase ChemteX Corporation)
Polyglycerol polyglycidyl ether
Number of epoxy groups: 3.0, Epoxy equivalent: 180 g/mol
(B-3) "Denacol®" Ex-821 (manufactured by Nagase ChemteX Corporation)
Polyethylene glycol diglycidyl ether
Number of epoxy groups: 2.0, Epoxy equivalent: 180 g/mol
(B-4) "EPICLON®" N660 (manufactured by DIC Corporation) Cresol novolac-type glycidyl ether Epoxy equivalent: 206 g/mol, the number of epoxy groups: 4.3
(B-5) "jER®" 828 (manufactured by Mitsubishi Chemical Corporation)
Bisphenol A-type epoxy
Number of epoxy groups: 2.0, Epoxy equivalent: 189 g/mol
(B-6) R-PG3 (manufactured by SAKAMOTO YAKUHIN KOGYO CO., LTD)
Polyglycerol
Number of epoxy groups: 0

C. Thermosetting Resin Components (C-1) to (C12)
(C-1) "jER®" 828 (manufactured by Mitsubishi Chemical Corporation)
Liquid bisphenol A epoxy resin
Epoxy equivalent: 189
(C-2) "jER®" 1001 (manufactured by Mitsubishi Chemical Corporation)
Liquid bisphenol A-type epoxy resin
Epoxy equivalent: 450
(C-3) "EPICLON®" Epc830 (manufactured by DIC Corporation)
Liquid bisphenol F-type epoxy resin
Epoxy equivalent: 170
(C-4) "jER®" 4004P (manufactured by Mitsubishi Chemical Corporation)
Solid bisphenol F-type epoxy resin
Epoxy equivalent: 880
(C-5) "Epotohto®" YDF2004 (manufactured by NIPPON STEEL & SUMIKIN CHEMICAL CO., LTD.)
Solid bisphenol F-type epoxy resin
Epoxy equivalent: 475
(C-6) "Araldite®" MY0600 (manufactured by Huntsman Advanced Materials)
Triglycidyl-m-aminophenol
Epoxy equivalent: 110
(C-7) "Araldite®" MY0500 (manufactured by Huntsman Advanced Materials)
Triglycidyl-p-aminophenol
Epoxy equivalent: 110
(C-8) GAN (manufactured by Nippon Kayaku Co., Ltd.)
Diglycidyl aniline epoxy
Epoxy equivalent: 125
(C-9) "Sumiepoxy®" ELM434 (manufactured by Sumitomo Chemical Co., Ltd.)
Tetraglycidyl diaminodiphenylmethane
Epoxy equivalent: 125
(C-10) "jER®" YX4000 (manufactured by Mitsubishi Chemical Corporation)
Biphenyl-type epoxy resin
Epoxy equivalent: 186
(C-11) "jER®" 1032 (manufactured by Mitsubishi Chemical Corporation)
Triphenol methane-type epoxy
Epoxy equivalent: 170
(C-12) "jER®" 154 (manufactured by Mitsubishi Chemical Corporation)
Phenol novolac-type epoxy
Epoxy equivalent: 178

Additional Component
Curing agent: Dicyandiamide (DICY, manufactured by Mitsubishi Chemical Corporation)
Curing accelerators:
3-(3,4-dichlorophenyl)-1,1-dimethylurea (DCMU99, manufactured by Hodogaya Chemical Co., Ltd.))

2,4-toluene bis(dimethylurea) ("Omicure®" 24, manufactured by Emerald Performance Materials, LLC)

Example 1

This example includes the following steps I to V.

Step I: Step of Producing Carbon Fiber Serving as Raw Material

Straight Layer

As a carbon fiber, an acrylonitrile copolymer was spun and calcined to give a carbon fiber having a total number of filaments of 12,000, a total fineness of 800 tex, a strand tensile strength of 5.1 GPa, and a strand elastic modulus of 240 GPa. Subsequently, the carbon fiber was subjected to an electrolytic surface treatment at a quantity of electricity of 70 coulombs per 1 g of the carbon fiber using an aqueous ammonium hydrogen carbonate solution at a concentration of 0.1 mol/L as an electrolyte solution. The electrically surface-treated carbon fiber was then washed with water and dried in hot air at a temperature of 150° C. to give Carbon Fiber (A-1) serving as a raw material. The surface oxygen concentration (O/C), surface hydroxyl group concentration (COH/C) and surface carboxyl group concentration (COOH/C) determined by methods of <Surface Oxygen Concentration (O/C) of Carbon Fiber> and <Surface Hydroxyl Group Concentration (COH/C) and Surface Carboxyl Group Concentration (COOH/C) of Carbon Fiber> were 0.15, 0.016 and 0.004, respectively.

Bias Layer

Carbon Fiber (A-1) was obtained in the same manner as the straight layer.

Step II: Step of Coating Carbon Fiber with Sizing Agent

Straight Layer

Sizing Agent (B-1) and acetone were mixed to obtain about 1 mass % acetone solution in which the sizing agent was uniformly dissolved. Using this acetone solution, the carbon fiber produced in (Straight Layer) of Step I was coated with a sizing agent by an immersion method and then heat-treated at a temperature of 230° C. for 180 seconds to obtain a sizing-agent-coated carbon fiber. The amount of sizing agent attached was 1.0 part by mass per 100 parts by mass of the surface-treated carbon fibers.

Bias Layer

The carbon fiber produced in (Bias Layer) of Step I was coated with Sizing Agent (B-1), in the same manner as the straight layer, thereby preparing a sizing-agent-coated carbon fiber.

Step III: Preparation of Thermosetting Resin

Straight Layer

Predetermined amounts of components other than the curing agent of the thermosetting resin component and curing accelerator described in (D-1) of Table 1 below were added to a kneader. The temperature of the mixture was increased to 150° C. while kneading the mixture, and the mixture was kneaded at the same temperature for 1 hour, thereby obtaining a transparent viscous liquid. The temperature of the viscous liquid was dropped to 60° C. while kneading the viscous liquid, then predetermined amounts of the curing agent and curing accelerator were added thereto, and kneaded to obtain Thermosetting Resin (D-1). Using this thermosetting resin, a cured product was prepared, according to the method described in <Bending Elastic Modulus of Cured Product of Thermosetting Resin>. The elastic modulus of this cured product was 4.4 GPa. The raw material ratio of Thermosetting Resin (D-1) was summarized in Table 1.

Bias Layer

Thermosetting Resin (D-1) was obtained in the same manner as the straight layer.

TABLE 1

| | | | D-1 | D-2 | D-3 | D-4 | D-5 | D-6 | D-7 | D-8 | D-9 | D-10 | D-11 | D-12 |
|---|---|---|---|---|---|---|---|---|---|---|---|---|---|---|
| Thermo- | Liquid Bis-A | "jER ®" 828 | 50 | 20 | | | 20 | | | | | 40 | | 20 |
| setting | Liquid Bis-A | "jER ®" 1001 | | | | | | | | | | | | |
| resin | Liquid Bis-F | Epc830 | | | 20 | 10 | | 40 | 20 | | | | 50 | 10 |
| component | Solid Bis-F | "jER ®" 4004P | | 30 | | | | 40 | 40 | | | | | 30 |
| (part by | Solid Bis-E | YDF2004 | | | 30 | 40 | | | | 20 | | 20 | | |
| mass) | m-Aminophenol | MY0600 | | 50 | | | 50 | | 30 | | | | | |
| | p-Aminophenol | MY0500 | 20 | | | | | | | 40 | 50 | | | 40 |
| | Diglycidyl aniline | GAN | 30 | | | | | 20 | 10 | | | 20 | 20 | |
| | TGDDM | ELM434 | | | 50 | 50 | | | | | 20 | 20 | | |
| | Biphenyl-type epoxy | YX4000 | | | | | | | | | 30 | | | |
| | Triphenyl methane-type epoxy | "jER ®" 1032 | | | | | | | | | 30 | | | |
| | Phenol novolac-type epoxy | "jER ®" 154 | | | | | 30 | | | 10 | | | 30 | |
| | Curing agent (part by mass) | DICY | 6 | 3 | 2 | 2 | 6 | 2 | 2 | 3 | 7 | 3 | 6 | 3 |
| | Curing accelerator (part by mass) | DCMU99 | 2 | 2 | | 2 | 3 | 2 | 2 | 2 | 3 | 2 | 2 | 2 |
| | | "Omicure ®" 24 | | | 2 | | | | | | | | | |
| | Elastic modulus of cured product (GPa) | | 4.4 | 4.3 | 4.0 | 4.0 | 4.3 | 4.2 | 4.3 | 4.0 | 4.3 | 4.2 | 4.1 | 4.0 |

TABLE 2

| | | | D-13 | D-14 | D-15 | D-16 | D-17 | D-18 | D-19 | D-20 | D-21 | D-22 | D-23 | D-24 | D-25 |
|---|---|---|---|---|---|---|---|---|---|---|---|---|---|---|---|
| Thermo-setting resin component (part by mass) | Liquid Bis-A | "jER ®" 828 | | | 30 | | 30 | | 30 | | 40 | 60 | | | 30 |
| | Liquid Bis-A | "jER ®" 1001 | | | | | | | | | 50 | | | | 40 |
| | Liquid Bis-F | Epc830 | | 20 | | 30 | | 10 | | 15 | | | 50 | 50 | |
| | Solid Bis-F | "jER ®" 4004P | | | | 30 | | 20 | | | | | 50 | 30 | |
| | Solid Bis-E | YDF2004 | | | | | | 20 | | 25 | | | | | |
| | m-Aminophenol | MY0600 | 30 | 10 | | | | | 30 | | | | | | |
| | p-Aminophenol | MY0500 | | | | | 40 | 30 | | | | | | | |
| | Diglycidyl aniline | GAN | | | 30 | | | | 20 | | 20 | | | | |
| | TGDDM | ELM434 | | 50 | 20 | | | | 30 | | 40 | | 40 | | |
| | Biphenyl-type epoxy | YX4000 | 40 | | | | | | | | | | | 10 | |
| | Triphenol methane-type epoxy | "jER ®" 1032 | | | | 20 | | 40 | | | | | | | |
| | Phenol novolac-type epoxy | "jER ®" 154 | 30 | 20 | | | | | | 40 | | 10 | | 10 | 30 |
| Curing agent (part by mass) | DICY | | 5.8 | 6.8 | 6.3 | 2.9 | 6.1 | 2.2 | 5.9 | 2.8 | 4.8 | 5.9 | 2.0 | 2.7 | 5.0 |
| Curing accelerator (part by mass) | DCMU99 | | 2 | | 2 | 2 | 3 | 2 | | 2 | 3 | 3 | 3 | 3 | 3 |
| | "Omicure ®" 24 | | | 3 | | | | | 3 | | | | | | |
| Elastic modulus of cured product (GPa) | | | 4.1 | 4.1 | 4.4 | 4.0 | 4.0 | 4.3 | 4.1 | 4.3 | 3.6 | 3.8 | 3.8 | 3.8 | 3.1 |

Step IV: Preparation of Prepreg

Straight Layer

The thermosetting resin prepared according to (Straight Layer) of Step III was applied on a release paper using a film coater to prepare a resin film. Next, the sizing-agent-coated carbon fibers prepared according to (Straight Layer) of Step II were aligned in a sheet form in one direction, and two resin films were laminated from both faces of the carbon fiber, and heated and pressed to impregnate the carbon fiber with the thermosetting resin, thereby preparing a prepreg. The carbon fiber mass per unit area was 125 g/m$^2$, and the fiber mass content was 75%. (Bias Layer)

The sizing-agent-coated carbon fibers prepared according to (Bias Layer) of Step II was impregnated with the thermosetting resin prepared according to (Bias Layer) of Step III, in the same manner as the prepreg used in the straight layer, thereby preparing a prepreg.

Step V: Preparation of Tubular Carbon Fiber Reinforced Composite Material

According to the following operations (a) to (e), a tubular carbon fiber reinforced composite material with an inner diameter of 6.3 mm was prepared. As mandrels, there were used stainless steel round rods with a diameter of 6.3 mm and a length of 1000 mm.

(a) From the prepreg prepared for the bias layer in Step IV, two sheets were cut out in a rectangular shape of 68 mm in length×800 mm in width, such that the fiber axis direction was at 45 degrees in reference to the long side direction. These two sheets were stuck together in such a way that the fiber direction mutually crossed, but staggered in the short side direction at 10 mm (corresponding in each case to half the mandrel circumference).

(b) The mutually stuck-together prepreg was wound onto the release-treated mandrel in such a way that the long side of the rectangular sheets of the prepreg matched the mandrel axial direction. (Bias layer)

(c) On top of this, the prepreg prepared for the straight layer in Step IV which was cut out in a rectangular shape of 80 mm in length×800 mm in width such that the long side direction was the fiber axis direction, and wound on the mandrel in such a way that its fiber direction matched the mandrel axis direction. (Straight layer)

(d) Furthermore, a wrapping tape (heat resistant film tape) was then wound round to cover the rolled product, and hot molding carried out at 130° C. for 90 minutes in a curing oven. Meanwhile, the wrapping tape had a width of 15 mm and wound at a tension of 3.0 kg and at a winding pitch (shift distance at a winding) of 1.0 mm. The tape was wound in two plies.

(e) Then, the mandrel was pulled out, and the wrapping tape was removed to obtain a tubular carbon fiber reinforced composite material. The interlaminar shear strength of the carbon fiber reinforced composite material constituting the straight layer and the bias layer was 130 MPa. The cylinder bending strength of this tubular carbon fiber reinforced composite material was 1300 MPa, thus dynamic characteristics were found to be sufficiently high. As a result of observing a fracture surface of the tubular carbon fiber reinforced composite material after cylinder bending test, the tubular carbon fiber reinforced composite material fractured from the bias layer. The results were summarized in Table 3.

Example 2

Step I: Step of Producing Carbon Fiber Serving as Raw Material

Straight Layer

A straight layer was prepared in the same manner as in Example 1, except that the carbon fiber was subjected to an electrolytic surface treatment at a quantity of electricity of 10 coulombs per 1 g of the carbon fiber, using a sulfuric acid solution at a concentration of 0.1 mol/L as an electrolyte solution. The electrically surface-treated carbon fiber was then washed with water and dried in hot air at a temperature of 150° C. to give Carbon Fiber (A-4) serving as a raw material. The surface oxygen concentration (O/C), surface hydroxyl group concentration (COH/C) and surface carboxyl group concentration (COOH/C) determined by the above-described methods were 0.09, 0.003 and 0.001, respectively.

Bias Layer

Carbon Fiber (A-1) was obtained in the same manner as in (Straight Layer) of Step I of Example 1.

Step II: Step of Attaching Sizing Agent to Carbon Fiber

The same procedure as in Example 1 was carried out. The amount of sizing agent attached was 1.0 part by mass per 100 parts by mass of the surface-treated carbon fibers.

Step III: Preparation of Thermosetting Resin

The same procedure as in Example 1 was carried out.

Step IV: Preparation of Prepreg

A prepreg was obtained in the same manner as in Example 1.

Step V: Preparation of Tubular Carbon Fiber Reinforced Composite Material

The same procedure as in Example 1 was carried out to prepare a tubular carbon fiber reinforced composite material. The interlaminar shear strength of the carbon fiber reinforced composite material constituting the straight layer was 105 MPa. The cylinder bending strength of the resulting tubular carbon fiber reinforced composite material was 1250 MPa, thus dynamic characteristics were found to be sufficiently high. As a result of observing a fracture surface of the tubular carbon fiber reinforced composite material after cylinder bending test, the tubular carbon fiber reinforced composite material fractured from the bias layer. The results were summarized in Table 3.

Example 3

Step I: Step of Producing Carbon Fiber Serving as Raw Material

Straight Layer

A straight layer was prepared in the same manner as in Example 1, except that the carbon fiber was subjected to an electrolytic surface treatment at a quantity of electricity of 40 coulombs per 1 g of the carbon fiber, using an ammonium hydrogen carbonate solution at a concentration of 0.1 mol/L as an electrolyte solution. The electrically surface-treated carbon fiber was then washed with water and dried in hot air at a temperature of 150° C. to give Carbon Fiber (A-2) serving as a raw material. The surface oxygen concentration (O/C), surface hydroxyl group concentration (COH/C) and surface carboxyl group concentration (COOH/C) determined by the above-described methods were 0.13, 0.0015 and 0.0005, respectively.

Bias Layer

Carbon Fiber (A-2) was obtained in the same manner as the straight layer.

Step II: Step of Attaching Sizing Agent to Carbon Fiber

The same procedure as in Example 1 was carried out. The amount of sizing agent attached was 1.0 part by mass per 100 parts by mass of the surface-treated carbon fibers.

Step III: Preparation of Thermosetting Resin

The same procedure as in Example 1 was carried out.

Step IV: Preparation of Prepreg

The same procedure as in Example 1 was carried out.

Step V: Preparation of Tubular Carbon Fiber Reinforced Composite Material

The same procedure as in Example 1 was carried out to prepare a tubular carbon fiber reinforced composite material. The interlaminar shear strength of the carbon fiber reinforced composite material constituting the straight layer and the bias layer was 120 MPa. The cylinder bending strength of this tubular carbon fiber reinforced composite material was 1250 MPa, thus dynamic characteristics were found to be sufficiently high. As a result of observing a fracture surface of the tubular carbon fiber reinforced composite material after cylinder bending test, the tubular carbon fiber reinforced composite material fractured from the bias layer. The results were summarized in Table 3.

Example 4

Step I: Step of Producing Carbon Fiber Serving as Raw Material

Straight Layer

The carbon fiber used in the straight layer was prepared in the same manner as in Example 1, except that the carbon fiber was subjected to an electrolytic surface treatment at a quantity of electricity of 100 coulombs per 1 g of the carbon fiber, using an ammonium hydrogen carbonate solution at a concentration of 0.1 mol/L as an electrolyte solution. The electrically surface-treated carbon fiber was then washed with water and dried in hot air at a temperature of 150° C. to give Carbon Fiber (A-3) serving as a raw material. The surface oxygen concentration (O/C), surface hydroxyl group concentration (COH/C) and surface carboxyl group concentration (COOH/C) determined by the above-described methods were 0.23, 0.002 and 0.008, respectively.

Bias Layer

Carbon Fiber (A-3) was obtained in the same manner as the straight layer.

Step II: Step of Attaching Sizing Agent to Carbon Fiber

The same procedure as in Example 1 was carried out. The amount of sizing agent attached was 1.0 part by mass per 100 parts by mass of the surface-treated carbon fibers.

Step III: Preparation of Thermosetting Resin

The same procedure as in Example 1 was carried out.

Step IV: Preparation of Prepreg

The same procedure as in Example 1 was carried out.

Step V: Preparation of Tubular Carbon Fiber Reinforced Composite Material

The same procedure as in Example 1 was carried out to prepare a tubular carbon fiber reinforced composite material. The interlaminar shear strength of the carbon fiber reinforced composite material constituting the straight layer and the bias layer was 130 MPa. The cylinder bending strength of this tubular carbon fiber reinforced composite material was 1300 MPa, thus dynamic characteristics were found to be sufficiently high. As a result of observing a fracture surface of the tubular carbon fiber reinforced composite material after cylinder bending test, the tubular carbon fiber reinforced composite material fractured from the bias layer. The results were summarized in Table 3.

Comparative Example 1

Step I: Step of Producing Carbon Fiber Serving as Raw Material

Straight Layer

Carbon Fiber (A-1) was obtained in the same manner as in (Straight Layer) of Step I of Example 1.

Bias Layer

Carbon Fiber (A-4) was obtained in the same manner as in (Straight Layer) of Step I of Example 2.

Step II: Step of Attaching Sizing Agent to Carbon Fiber

The same procedure as in Example 1 was carried out. The amount of sizing agent attached was 1.0 part by mass per 100 parts by mass of the surface-treated carbon fibers.

Step III: Preparation of Thermosetting Resin

The same procedure as in Example 1 was carried out.

Step IV: Preparation of Prepreg

The same procedure as in Example 1 was carried out.

Step V: Preparation of Tubular carbon fiber reinforced composite material

The same procedure as in Example 1 was carried out to prepare a tubular carbon fiber reinforced composite material. The cylinder bending strength of this tubular carbon fiber reinforced composite material was 1150 MPa, thus dynamic characteristics were insufficient. As a result of observing a fracture surface of the tubular carbon fiber reinforced composite material after cylinder bending test, the tubular carbon fiber reinforced composite material fractured from the bias layer. It was confirmed that, even when there is a starting point of fracture in the bias layer, the cylinder bending strength is insufficient in a case where the interlaminar shear strength of the carbon fiber reinforced composite material constituting the bias layer is less than 110 MPa. The results were summarized in Table 3.

Comparative Example 2

Step I: Step of Producing Carbon Fiber Serving as Raw Material

Straight Layer

As the carbon fiber used in the straight layer, Carbon Fiber (A-4) was obtained in the same manner as in (Straight Layer) of Step I of Example 2.

Bias Layer

As the carbon fiber used in the bias layer, Carbon Fiber (A-4) was obtained in the same manner as the straight layer.

Step II: Step of Attaching Sizing Agent to Carbon Fiber

The same procedure as in Example 1 was carried out. The amount of sizing agent attached was 1.0 part by mass per 100 parts by mass of the surface-treated carbon fibers.

Step III: Preparation of Thermosetting Resin

The same procedure as in Example 1 was carried out.

Step IV: Preparation of Prepreg

The same procedure as in Example 1 was carried out.

Step V: Preparation of Tubular Carbon Fiber Reinforced Composite Material

The same procedure as in Example 1 was carried out to prepare a tubular carbon fiber reinforced composite material. The cylinder bending strength of this tubular carbon fiber reinforced composite material was 1150 MPa, thus dynamic characteristics were insufficient. As a result of observing a fracture surface of the tubular carbon fiber reinforced composite material after cylinder bending test, the tubular carbon fiber reinforced composite material fractured from the bias layer. The results were summarized in Table 3.

TABLE 3

| | | | Example 1 | Example 2 | Example 3 | Example 4 | Comparative Example 1 | Comparative Example 2 |
|---|---|---|---|---|---|---|---|---|
| Straight layer | Carbon Fiber S | | A-1 | A-4 | A-2 | A-3 | A-1 | A-4 |
| | Sizing Agent S | | B-1 | B-1 | B-1 | B-1 | B-1 | B-1 |
| | Thermosetting Resin S | | D-1 | D-1 | D-1 | D-1 | D-1 | D-1 |
| Bias layer | Carbon Fiber B | | A-1 | A-1 | A-2 | A-3 | A-4 | A-4 |
| | Sizing Agent B | | B-1 | B-1 | B-1 | B-1 | B-1 | B-1 |
| | Thermosetting Resin B | | D-1 | D-1 | D-1 | D-1 | D-1 | D-1 |
| Elastic modulus of cured product of thermosetting resin S | | GPa | 4.4 | 4.4 | 4.4 | 4.4 | 4.4 | 4.4 |
| Elastic modulus of cured product of thermosetting resin B | | GPa | 4.4 | 4.4 | 4.4 | 4.4 | 4.4 | 4.4 |
| Interfacial shear strength of carbon fiber-reinforced composite material constituting straight layer | | MPa | 130 | 105 | 120 | 130 | 130 | 105 |
| Interfacial shear strength of carbon fiber-reinforced composite material constituting bias layer | | MPa | 130 | 130 | 120 | 130 | 105 | 105 |
| Cylinder bending test of tubular body | | MPa | 1300 | 1250 | 1200 | 1300 | 1150 | 1150 |

Examples 5 to 24

Step I: Step of Producing Carbon Fiber Serving as Raw Material

The same procedure as in Example 1 was carried out.

Step II: Step of Attaching Sizing Agent to Carbon Fiber

The same procedure as in Example 1 was carried out. The amount of sizing agent attached was 1.0 part by mass per 100 parts by mass of the surface-treated carbon fibers.

Step III: Preparation of Thermosetting Resin

Thermosetting Resins (D-2) to (D-21) were prepared in the same manner as in Example 1, except that the thermosetting resin components used in the straight layer and/or the bias layer were changed to the compositions of (D-2) to (D-21) shown in Table 1 and Table 2, and kneaded. The elastic modulus of the cured product of this thermosetting resin was 3.6 to 4.4 GPa.

Step IV: Preparation of Prepreg

Prepregs used in the straight and bias layer were prepared in the same manner as in Example 1, except that the thermosetting resins used in the straight and/or bias layer were changed to the (D-2) to (D-21) shown in Table 4.

Step V: Preparation of Tubular Carbon Fiber Reinforced Composite Material

The same procedure as in Example 1 was carried out to prepare a tubular carbon fiber reinforced composite material. The interlaminar shear strength of the carbon fiber reinforced composite material constituting the straight layer and/or the bias layer was 110 to 130 MPa. The cylinder bending strength of this tubular carbon fiber reinforced composite material was 1200 to 1300 MPa, thus dynamic characteristics were found to be sufficiently high. As a result of observing a fracture surface of the tubular carbon fiber reinforced composite material after cylinder bending test, the tubular carbon fiber reinforced composite material fractured from the bias layer. The results were summarized in Table 4.

Comparative Examples 3 to 8

Step I: Step of Producing Carbon Fiber Serving as Raw Material

The same procedure as in Example 1 was carried out.

Step II: Step of Attaching Sizing Agent to Carbon Fiber

The same procedure as in Example 1 was carried out. The amount of sizing agent attached was 1.0 part by mass per 100 parts by mass of the surface-treated carbon fibers.

Step III: Preparation of Thermosetting Resin

Thermosetting Resins (D-1), and (D-21) to (D-25) were prepared in the same manner as in Example 1, except that the thermosetting resin components used in the straight layer and/or the bias layer were changed to the compositions of (D-1), and (D-21) to (D-25) shown in Table 2. The elastic modulus of the cured product of this thermosetting resin was 3.1 to 4.4 GPa.

Step IV: Preparation of Prepreg

Prepregs used in the straight and bias layer were prepared in the same manner as in Example 1, except that the thermosetting resins used in the straight and/or bias layer were changed to the (D-1), and (D-21) to (D-25) shown in Table 4.

Step V: Preparation of Tubular Carbon Fiber Reinforced Composite Material

The same procedure as in Example 1 was carried out to prepare a tubular carbon fiber reinforced composite material. The interlaminar shear strength of the carbon fiber reinforced composite material constituting the straight layer and the bias layer was 100 to 130 MPa. The cylinder bending strength of this tubular carbon fiber reinforced composite material was 1000 to 1100 MPa, thus dynamic characteristics were found to be insufficient. As a result of observing a fracture surface of the tubular carbon fiber reinforced composite material after cylinder bending test, the tubular carbon fiber reinforced composite material fractured from the straight layer. It was confirmed that, even when the interlaminar shear strength of the carbon fiber reinforced composite material constituting the bias layer is 110 MPa or more, in an elastic modulus of a cured product of the thermosetting resin in the straight layer of less than 4.0 GPa, the carbon fiber reinforced composite material fractures from the straight layer, and cylinder bending strength is insufficient. The results were summarized in Table 4.

Table 4-1

|  |  | | Example 5 | Example 6 | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|---|---|
| Straight layer | Carbon Fiber S | | A-1 | A-1 | A-1 | A-1 | A-1 | A-1 | A-1 | A-1 | A-1 | A-1 | A-1 | A-1 | A-1 |
| | Sizing Agent S | | B-1 | B-1 | B-1 | B-1 | B-1 | B-1 | B-1 | B-1 | B-1 | B-1 | B-1 | B-1 | B-1 |
| | Thermosetting Resin S | | D-2 | D-3 | D-4 | D-5 | D-6 | D-7 | D-8 | D-9 | D-10 | D-11 | D-12 | D-13 | D-14 |
| Bias layer | Carbon Fiber B | | A-1 | A-1 | A-1 | A-1 | A-1 | A-1 | A-1 | A-1 | A-1 | A-1 | A-1 | A-1 | A-1 |
| | Sizing Agent B | | B-1 | B-1 | B-1 | B-1 | B-1 | B-1 | B-1 | B-1 | B-1 | B-1 | B-1 | B-1 | B-1 |
| | Thermosetting Resin B | | D-2 | D-3 | D-4 | D-5 | D-6 | D-7 | D-8 | D-9 | D-10 | D-11 | D-12 | D-13 | D-14 |
| Elastic modulus of cured product of thermosetting resin S | | GPa | 4.3 | 4.0 | 4.0 | 4.3 | 4.2 | 4.3 | 4.0 | 4.3 | 4.2 | 4.1 | 4.0 | 4.1 | 4.1 |
| Elastic modulus of cured product of thermosetting resin B | | GPa | 4.3 | 4.0 | 4.0 | 4.3 | 4.2 | 4.3 | 4.0 | 4.3 | 4.2 | 4.1 | 4.0 | 4.1 | 4.1 |
| Interfacial shear strength of carbon fiber-reinforced composite material constituting straight layer | | GPa | 130 | 120 | 120 | 130 | 125 | 130 | 120 | 130 | 125 | 125 | 120 | 120 | 120 |
| Interfacial shear strength of carbon fiber-reinforced composite material constituting bias layer | | MPa | 130 | 120 | 120 | 130 | 125 | 130 | 120 | 130 | 125 | 125 | 120 | 120 | 120 |
| Cylinder bending test of tubular body | | MPa | 1300 | 1250 | 1250 | 1300 | 1300 | 1300 | 1250 | 1300 | 1300 | 1300 | 1250 | 1250 | 1250 |

-continued

Table 4-2

|  |  | Example 18 | Example 19 | Example 20 | Example 21 | Example 22 | Example 23 | Example 24 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|
| Straight layer | Carbon Fiber S | A-1 | A-1 | A-1 | A-1 | A-1 | A-1 | A-1 | A-1 | A-1 | A-1 | A-1 | A-1 | A-1 |
|  | Sizing Agent S | B-1 | B-1 | B-1 | B-1 | B-1 | B-1 | B-1 | B-1 | B-1 | B-1 | B-1 | B-1 | B-1 |
|  | Thermosetting Resin S | D-15 | D-16 | D-17 | D-18 | D-19 | D-20 | D-1 | D-21 | D-22 | D-23 | D-24 | D-25 | D-21 |
| Bias layer | Carbon Fiber B | A-1 | A-1 | A-1 | A-1 | A-1 | A-1 | A-1 | A-1 | A-1 | A-1 | A-1 | A-1 | A-1 |
|  | Sizing Agent B | B-1 | B-1 | B-1 | B-1 | B-1 | B-1 | B-1 | B-1 | B-1 | B-1 | B-1 | B-1 | B-1 |
|  | Thermosetting Resin B | D-15 | D-16 | D-17 | D-18 | D-19 | D-20 | D-21 | D-21 | D-22 | D-23 | D-24 | D-25 | D-1 |
| Elastic modulus of cured product of thermosetting resin S | GPa | 4.4 | 4.0 | 4.0 | 4.3 | 4.1 | 4.3 | 4.4 | 3.6 | 3.8 | 3.8 | 3.8 | 3.1 | 3.6 |
| Elastic modulus of cured product of thermosetting resin B | GPa | 4.4 | 4.0 | 4.0 | 4.3 | 4.1 | 4.3 | 3.6 | 3.6 | 3.8 | 3.8 | 3.8 | 3.1 | 4.4 |
| Interfacial shear strength of carbon fiber-reinforced composite material constituting straight layer | MPa | 130 | 120 | 120 | 130 | 120 | 130 | 130 | 110 | 115 | 115 | 115 | 100 | 110 |
| Interfacial shear strength of carbon fiber-reinforced composite material constituting bias layer | MPa | 130 | 120 | 120 | 130 | 120 | 130 | 110 | 110 | 115 | 115 | 115 | 100 | 130 |
| Cylinder bending test of tubular body | MPa | 1300 | 1250 | 1250 | 1300 | 1250 | 1300 | 1200 | 1100 | 1100 | 1100 | 1100 | 1000 | 1100 |

Examples 25 to 31

Step I: Step of Producing Carbon Fiber Serving as Raw Material

The same procedure as in Example 1 was carried out.

Step II: Step of Attaching Sizing Agent to Carbon Fiber

The same procedure as in Example 1 was carried out except that the sizing agent applied to a carbon fiber of the straight layer and the bias layer was changed to the mass ratio as shown in Table 5. The amount of sizing agent attached was 1.0 part by mass per 100 parts by mass of the surface-treated carbon fibers.

Step III: Preparation of Thermosetting Resin

The same procedure as in Example 1 was carried out.

Step IV: Preparation of Prepreg

The same procedure as in Example 1 was carried out.

Step V: Preparation of Tubular Carbon Fiber Reinforced Composite Material

The same procedure as in Example 1 was carried out to prepare a tubular carbon fiber reinforced composite material. The interlaminar shear strength of the carbon fiber reinforced composite material constituting the straight layer and/or the bias layer was 100 to 130 MPa. The cylinder bending strength of this tubular carbon fiber reinforced composite material was 1200 to 1300 MPa, thus dynamic characteristics were found to be sufficiently high. As a result of observing a fracture surface of the tubular carbon fiber reinforced composite material after cylinder bending test, the tubular carbon fiber reinforced composite material fractured from the bias layer. The results were summarized in Table 5.

Comparative Example 9

Step I: Step of Producing Carbon Fiber Serving as Raw Material

The same procedure as in Example 1 was carried out.

Step II: Step of Attaching Sizing Agent to Carbon Fiber

The same procedure as in Example 1 was carried out except that the sizing agent applied to a carbon fiber of the straight layer and the bias layer was changed to (B-6). The amount of sizing agent attached was 1.0 part by mass per 100 parts by mass of the surface-treated carbon fibers.

Step III: Preparation of Thermosetting Resin

The same procedure as in Example 1 was carried out.

Step IV: Preparation of Prepreg

The same procedure as in Example 1 was carried out.

Step V: Preparation of Tubular Carbon Fiber Reinforced Composite Material

The same procedure as in Example 1 was carried out to prepare a tubular carbon fiber reinforced composite material. The interlaminar shear strength of the carbon fiber reinforced composite material constituting the straight layer and the bias layer was 100 MPa. The cylinder bending strength of this tubular carbon fiber reinforced composite material was 1100 MPa, thus dynamic characteristics were found to be insufficient. As a result of observing a fracture surface of the tubular carbon fiber reinforced composite material after cylinder bending test, the tubular carbon fiber reinforced composite material fractured from the bias layer. The results were summarized in Table 5.

Comparative Example 10

Step I: Step of Producing Carbon Fiber Serving as Raw Material

The same procedure as in Example 1 was carried out.

Step II: Step of Attaching Sizing Agent to Carbon Fiber

The same procedure as in Example 1 was carried out except that the sizing agent applied to the carbon fiber used in the bias layer was changed to (B-6). The amount of sizing agent attached was 1.0 part by mass per 100 parts by mass of the surface-treated carbon fibers.

Step III: Preparation of Thermosetting Resin
The same procedure as in Example 1 was carried out.
Step IV: Preparation of Prepreg
The same procedure as in Example 1 was carried out.
Step V: Preparation of Tubular carbon fiber reinforced composite material
The same procedure as in Example 1 was carried out to prepare a tubular carbon fiber reinforced composite material. The cylinder bending strength of this tubular carbon fiber reinforced composite material was 1100 MPa, thus dynamic characteristics were found to be insufficient. As a result of observing a fracture surface of the tubular carbon fiber reinforced composite material after cylinder bending test, the tubular carbon fiber reinforced composite material fractured from the bias layer. The results were summarized in Table 5.

Comparative Example 11

Step I: Step of Producing Carbon Fiber Serving as Raw Material
The same procedure as in Example 1 was carried out.

Step II: Step of Attaching Sizing Agent to Carbon Fiber
The sizing agent was not applied to the carbon fiber of the straight layer and the bias layer, thus the step was omitted.
Step III: Preparation of Thermosetting Resin
The same procedure as in Example 1 was carried out.
Step IV: Preparation of Prepreg
A prepreg was obtained in the same manner as in Example 1, except that the carbon fiber coated with the sizing agent was changed to the carbon fiber not coated with the sizing agent obtained in Step I.
Step V: Preparation of Tubular carbon fiber reinforced composite material
The same procedure as in Example 1 was carried out to prepare a tubular carbon fiber reinforced composite material. The interlaminar shear strength of the carbon fiber reinforced composite material constituting the straight layer and the bias layer was 95 MPa. The cylinder bending strength of this tubular carbon fiber reinforced composite material was 1050 MPa, thus dynamic characteristics were found to be insufficient. As a result of observing a fracture surface of the tubular carbon fiber reinforced composite material after cylinder bending test, the tubular carbon fiber reinforced composite material fractured from the bias layer. The results were summarized in Table 5.

TABLE 5

| | | | | | Example 1 | Example 25 | Example 26 | Example 27 | Example 28 | Example 29 | Example 30 | Example 31 | Comparative Example 9 | Comparative Example 10 | Comparative Example 11 |
|---|---|---|---|---|---|---|---|---|---|---|---|---|---|---|---|
| Straight layer | Carbon Fibers S | | | | A-1 | A-1 | A-1 | A-1 | A-1 | A-1 | A-1 | A-1 | A-1 | A-1 | A-1 |
| | Sizing Agent S (part by mass) | B-1 | Ex-411 | | 100 | 70 | 30 | | | | | | | 100 | |
| | | B-2 | Ex-521 | | | | | 100 | | | | | | | |
| | | B-3 | Ex-821 | | | | | | 100 | | | | | | |
| | | B-4 | N660 | | | | | | | 100 | | | | | |
| | | B-5 | "jER ®" 828 | | | | | | | | 100 | | | | |
| | | B-6 | R-PG3 | | | 30 | 70 | | | | | 100 | 100 | | |
| | | Epoxy equivalent (g/mol) | | | 230 | 330 | 770 | 180 | 180 | 210 | 190 | — | — | 230 | — |
| | Thermosetting Resin S | | | | D-1 | D-1 | D-1 | D-1 | D-1 | D-1 | D-1 | D-1 | D-1 | D-1 | D-1 |
| Bias layer | Carbon Fiber B | | | | A-1 | A-1 | A-1 | A-1 | A-1 | A-1 | A-1 | A-1 | A-1 | A-1 | A-1 |
| | Sizing Agent B (part by mass) | B-1 | Ex-411 | | 100 | 70 | 30 | | | | | | 100 | | |
| | | B-2 | Ex-521 | | | | | 100 | | | | | | | |
| | | B-3 | Ex-821 | | | | | | 100 | | | | | | |
| | | B-4 | N660 | | | | | | | 100 | | | | | |
| | | B-5 | "jER ®" 828 | | | | | | | | 100 | | | | |
| | | B-6 | R-PG3 | | | 30 | 70 | | | | | | 100 | 100 | |
| | | Epoxy equivalent (g/mol) | | | 230 | 330 | 770 | 180 | 180 | 210 | 190 | 230 | — | — | — |
| | Thermosetting Resin B | | | | D-1 | D-1 | D-1 | D-1 | D-1 | D-1 | D-1 | D-1 | D-1 | D-1 | D-1 |
| Elastic modulus of cured product of thermosetting resin S | | | | GPa | 4.4 | 4.4 | 4.4 | 4.4 | 4.4 | 4.4 | 4.4 | 4.4 | 4.4 | 4.4 | 4.4 |
| Elastic modulus of cured product of thermosetting resin B | | | | GPa | 4.4 | 4.4 | 4.4 | 4.4 | 4.4 | 4.4 | 4.4 | 4.4 | 4.4 | 4.4 | 4.4 |
| Interfacial shear strength of carbon fiber-reinforced composite material constituting straight layer | | | | MPa | 130 | 120 | 115 | 130 | 120 | 115 | 110 | 100 | 100 | 130 | 95 |
| Interfacial shear strength of carbon fiber-reinforced composite material constituting bias layer | | | | MPa | 130 | 120 | 115 | 130 | 120 | 115 | 110 | 130 | 100 | 100 | 95 |
| Cylinder bending test of tubular body | | | | MPa | 1300 | 1250 | 1200 | 1300 | 1250 | 1200 | 1200 | 1300 | 1100 | 1100 | 1050 |

INDUSTRIAL APPLICABILITY

According to the present invention, tubular carbon fiber reinforced composite material having excellent cylinder bending strength is obtained, and is particularly suitably used for a structure material. For example, it is suitably used for a structure material of sporting goods such as a golf club shaft, and badminton racket, aerospace structures, truss, mast, ships, and propeller shafts of automobiles.

The invention claimed is:

1. A tubular carbon fiber reinforced composite material obtained by laminating a straight layer comprises a thermosetting resin S, in which a carbon fiber S coated with a sizing agent S is arranged in parallel with a direction of −20° to +20° with respect to the tube axis of a tubular body, and
    a bias layer comprising a thermosetting resin B, in which a carbon fiber B coated with a sizing agent B is arranged in parallel with a direction of +25° to +65° with respect to the tube axis of a tubular body, and
    the carbon fiber B and the sizing agent B satisfy at least below either (i) or (ii), and
    the interlaminar shear strength of the carbon fiber reinforced composite material constituting the bias layer is 110 MPa or more, and the elastic modulus of a cured product of the thermosetting resin S is 4.0 GPa or more,
    (i) the carbon fiber B is obtained by coating with the sizing agent B a carbon fiber in which the surface oxygen concentration (0/C) determined by X-ray photoelectron spectroscopy is 0.25 or less, the surface hydroxyl group concentration (COH/C) determined by chemical modification X-ray photoelectron spectroscopy is 0.005 or more, and the surface carboxyl group concentration (COOH/C) determined by chemical modification X-ray photoelectron spectroscopy is 0.01 or less,
    (ii) the sizing agent B contains an aliphatic epoxy resin.

2. The tubular carbon fiber reinforced composite material according to claim 1, wherein the elastic modulus of a cured product of the thermosetting resin B is 4.0 GPa or more.

3. The tubular carbon fiber reinforced composite material according to claim 1, wherein in the case of above (ii), the carbon fiber B is obtained by coating with the sizing agent B a carbon fiber in which the surface oxygen concentration (0/C) determined by X-ray photoelectron spectroscopy is 0.25 or less, the surface hydroxyl group concentration (COH/C) determined by chemical modification X-ray photoelectron spectroscopy is 0.005 or more, and the surface carboxyl group concentration (COOH/C) determined by chemical modification X-ray photoelectron spectroscopy is 0.01 or less.

4. The tubular carbon fiber reinforced composite material according to claim 1, wherein in the case of above (ii), the aliphatic epoxy resin is a glycidyl-ether-type epoxy resin obtained by the reaction of at least one member selected from the group consisting of glycerol, diglycerol, polyglycerol, trimethylolpropane, pentaerythritol, sorbitol and arabitol, with epichlorohydrin.

5. A golf club shaft using the tubular carbon fiber reinforced composite material as defined in claim 1.

6. The tubular carbon fiber reinforced composite material according to claim 1, wherein in the case of above (i), the sizing agent B contains one kind or more epoxy resins.

7. The tubular carbon fiber reinforced composite material according to claim 6, wherein the epoxy equivalent of the total epoxy resins contained in the sizing agent B is 350 g/mol or less.

8. The tubular carbon fiber reinforced composite material according claim 6, wherein the sizing agent B contains three or more functional groups of epoxy resins.

9. The tubular carbon fiber reinforced composite material according to claim 6, wherein the sizing agent B contains an epoxy resin having an epoxy equivalent of 250 g/mol or less.

10. The tubular carbon fiber reinforced composite material according to claim 1, wherein the thermosetting resin S contains one kind or more epoxy resins.

11. The tubular carbon fiber reinforced composite material according to claim 10, wherein the thermosetting resin S contains at least one kind of epoxy resins selected from the group consisting of aminophenol-type epoxy resins, tetraglycidyldiaminodiphenylmethane, solid bisphenol F-type epoxy resins, diglycidyl aniline, and triphenylmethane-type epoxy resins.

* * * * *